US012524957B2

(12) United States Patent
Sung et al.

(10) Patent No.: US 12,524,957 B2
(45) Date of Patent: Jan. 13, 2026

(54) METHOD OF GENERATING THREE-DIMENSIONAL MODEL AND DATA PROCESSING DEVICE PERFORMING THE SAME

(71) Applicant: Samsung Electronics Co., Ltd., Suwon-si (KR)

(72) Inventors: Changhun Sung, Suwon-si (KR); Byungdeok Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 361 days.

(21) Appl. No.: 18/153,020

(22) Filed: Jan. 11, 2023

(65) Prior Publication Data

US 2023/0267681 A1    Aug. 24, 2023

(30) Foreign Application Priority Data

Feb. 23, 2022  (KR) ........................ 10-2022-0023364
Jun. 20, 2022  (KR) ........................ 10-2022-0074844

(51) Int. Cl.
*G06T 17/00*  (2006.01)
*G06T 7/32*   (2017.01)
(Continued)

(52) U.S. Cl.
CPC ................ *G06T 17/00* (2013.01); *G06T 7/32* (2017.01); *G06T 7/33* (2017.01); *G06T 7/55* (2017.01);
(Continued)

(58) Field of Classification Search
CPC . G06T 2207/10016; G06T 2207/10028; G06T 7/11; G06T 17/00; G06T 7/246;
(Continued)

(56) References Cited

U.S. PATENT DOCUMENTS 8,948,482 B2   2/2015  Levin
9,076,250 B2   7/2015  Kim et al.
(Continued)

FOREIGN PATENT DOCUMENTS

KR   100930994 B1   12/2009
KR   100941872 B1    2/2010
(Continued)

*Primary Examiner* — Xiao M Wu
*Assistant Examiner* — Scott E Sonners
(74) *Attorney, Agent, or Firm* — Harness, Dickey & Pierce, P.L.C.

(57) ABSTRACT

Input images are obtained to include color data and depth data of a target. An image graph is generated based on the color data of the input images such that the image graph includes correlation values between the input images. A registration order is determined based on the image graph. Pose information of each input image is sequentially generated based on the registration order and the depth data of the input images. The input images are sequentially registered as registered images such that each registered image includes the pose information. A three-dimensional model of the target is reconstructed based on the registered images. The pose information may be generated and the elaborate three-dimensional model may be reconstructed by determining the registration order based on the color data and sequentially generating the pose information of the input images according to the registration order using the registered images.

20 Claims, 30 Drawing Sheets (3 of 30 Drawing Sheet(s) Filed in Color)

(51) Int. Cl.
*G06T 7/33* (2017.01)
*G06T 7/55* (2017.01)
*G06T 7/70* (2017.01)
*G06T 7/90* (2017.01)

(52) U.S. Cl.
CPC ............... *G06T 7/70* (2017.01); *G06T 7/90* (2017.01); *G06T 2207/10028* (2013.01); *G06T 2207/20072* (2013.01); *G06T 2207/30168* (2013.01); *G06T 2210/56* (2013.01)

(58) Field of Classification Search
CPC .... G06T 7/12; G06T 7/73; G06T 7/70; G06T 7/162; G06T 2207/20072; G06T 2207/20221; G06T 2207/30196; G06T 7/194; G06T 19/006; G06T 7/50; G06T 7/90; G06T 7/13; G06T 7/20; G06T 7/136; G06T 2200/04; G06T 5/50; G06T 7/579; G06T 2207/30244; G06T 2207/30241; G06T 7/33; G06T 7/55; G06T 7/74; G06T 7/174; G06T 19/00; G06T 2200/08; G06T 7/10; G06T 15/205; G06T 13/40; G06T 7/30; G06T 7/97; G06T 15/00; G06T 2215/16; G06T 7/00; G06T 13/00; G06T 7/40; G06T 2207/20112; G06T 1/0007
See application file for complete search history.

(56) References Cited

U.S. PATENT DOCUMENTS

| | | | |
|---|---|---|---|
| 9,214,014 B2 | 12/2015 | Levin | |
| 9,443,350 B2 | 9/2016 | Wagner et al. | |
| 9,574,874 B2 | 2/2017 | Son et al. | |
| 9,589,329 B2 | 3/2017 | Levin | |
| 9,639,943 B1 | 5/2017 | Kutliroff et al. | |
| 9,830,688 B2 | 11/2017 | Levin | |
| 9,875,545 B2 | 1/2018 | Rhee et al. | |
| 9,912,862 B2 | 3/2018 | Peruch et al. | |
| 10,178,366 B2 | 1/2019 | Lucas | |
| 10,275,862 B2 | 4/2019 | Levin | |
| 10,373,380 B2 | 8/2019 | Kutliroff et al. | |
| 10,600,160 B2 | 3/2020 | Levin | |
| 10,891,779 B2 | 1/2021 | Nguyen | |
| 11,189,093 B2 | 11/2021 | Wei et al. | |
| 11,321,817 B2 | 5/2022 | Levin | |
| 2022/0254045 A1* | 8/2022 | Boardman | H04N 23/695 |

FOREIGN PATENT DOCUMENTS

| | | |
|---|---|---|
| KR | 101954487 B1 | 3/2019 |
| KR | 101956312 B1 | 3/2019 |
| KR | 101968991 B1 | 4/2019 |
| KR | 102060004 B1 | 12/2019 |
| KR | 102207855 B1 | 1/2021 |
| KR | 102298098 B1 | 9/2021 |

* cited by examiner

FIG. 8

| I0 | I1 | I2 | I3 | I4 |
|---|---|---|---|---|
| $X_{01}$ | | $X_{21}$ | $X_{31}$ | |
| $X_{02}$ | $X_{11}$ | $X_{22}$ | $X_{32}$ | |
| $X_{03}$ | | $X_{23}$ | | $X_{41}$ |
| | $X_{12}$ | $X_{24}$ | | $X_{42}$ |
| | $X_{13}$ | $X_{25}$ | $X_{33}$ | $X_{43}$ |
| $X_{04}$ | $X_{14}$ | $X_{26}$ | $X_{34}$ | |
| $X_{05}$ | | $X_{27}$ | $X_{35}$ | $X_{44}$ |

MINF

FIG. 9

IMGR

| | $I_1$ | $I_2$ | $I_3$ | $I_4$ | $I_5$ | $I_6$ | $I_7$ | $I_8$ | $I_9$ |
|---|---|---|---|---|---|---|---|---|---|
| $I_1$ | – | 3 | 15 | 13 | 11 | 19 | 7 | 11 | 5 |
| $I_2$ | 3 | – | 120 | 117 | 112 | 67 | 83 | 71 | 65 |
| $I_3$ | 15 | 120 | – | 145 | 132 | 130 | 105 | 92 | 77 |
| $I_4$ | 13 | 117 | 145 | – | 162 | 171 | 150 | 121 | 83 |
| $I_5$ | 11 | 112 | 132 | 62 | – | 203 | 160 | 139 | 92 |
| $I_6$ | 19 | 67 | 103 | 171 | 203 | – | 83 | 150 | 131 |
| $I_7$ | 7 | 83 | 105 | 150 | 160 | 183 | – | 121 | 108 |
| $I_8$ | 11 | 71 | 92 | 121 | 139 | 150 | 121 | – | 140 |
| $I_9$ | 5 | 65 | 77 | 83 | 92 | 131 | 108 | 140 | – |

FIG. 11

IMGR

| | $I_1$ | $I_2$ | $I_3$ | $I_4$ | $I_5$ | $I_6$ | $I_7$ | $I_8$ | $I_9$ |
|---|---|---|---|---|---|---|---|---|---|
| $I_1$ | – | 3 | 15 | 13 | 11 | 19 | 7 | 11 | 5 |
| $I_2$ | 3 | – | 120 | 117 | 112 | 67 | 83 | 71 | 65 |
| $I_3$ | 15 | 120 | – | 145 | 132 | 130 | 105 | 92 | 77 |
| $I_4$ | 13 | 117 | 145 | – | 162 | 171 | 150 | 121 | 83 |
| $I_5$ | 11 | 112 | 132 | 62 | – | 203 | 160 | 139 | 92 |
| $I_6$ | 19 | 67 | 103 | 171 | 203 | – | 183 | 150 | 131 |
| $I_7$ | 7 | 83 | 105 | 150 | 160 | 83 | – | 121 | 108 |
| $I_8$ | 11 | 71 | 92 | 121 | 139 | 150 | 121 | – | 140 |
| $I_9$ | 5 | 65 | 77 | 83 | 92 | 131 | 108 | 140 | – |

FIG. 12

|  | $I_1$ | $I_2$ | $I_3$ | $I_4$ | $(I_5)$ | $(I_6)$ | $I_7$ | $(I_8)$ | $I_9$ | CSM |
|---|---|---|---|---|---|---|---|---|---|---|
| $I_1$ | – | 3 | 15 | 13 | 11 | 19 | 7 | 11 | 5 | 30 |
| $I_2$ | 3 | – | 120 | 117 | 112 | 67 | 83 | 71 | 65 | 179 |
| $I_3$ | 15 | 120 | – | 145 | 132 | 130 | 105 | 92 | 77 | 262 |
| $I_4$ | 13 | 117 | 145 | – | 162 | 171 | 150 | 121 | 83 | 233 |
| $(I_5)$ | 11 | 112 | 132 | 62 | – | 203 | 160 | 139 | 92 | – |
| $(I_6)$ | 19 | 67 | 103 | 171 | 203 | – | 183 | 150 | 131 | – |
| $I_7$ | 7 | 83 | 105 | 150 | 160 | 83 | – | 121 | 108 | 243 |
| $(I_8)$ | 11 | 71 | 92 | 121 | 139 | 150 | 121 | – | 140 | (289) |
| $I_9$ | 5 | 65 | 77 | 83 | 92 | 131 | 108 | 140 | – | 223 |

IMGR

FIG. 13

| | $I_1$ | $I_2$ | $I_3$ | $I_4$ | $I_5$ | $I_6$ | $I_7$ | $I_8$ | $I_9$ | CSM |
|---|---|---|---|---|---|---|---|---|---|---|
| $I_1$ | – | 3 | 15 | 13 | 11 | 19 | 7 | 11 | 5 | 41 |
| $I_2$ | 3 | – | 120 | 117 | 112 | 67 | 83 | 71 | 65 | 250 |
| $I_3$ | 15 | 120 | – | 145 | 132 | 130 | 105 | 92 | 77 | 354 |
| $I_4$ | 13 | 117 | 145 | – | 162 | 171 | 150 | 121 | 83 | 354 |
| $I_5$ | 11 | 112 | 132 | 62 | – | 203 | 160 | 139 | 92 | – |
| $I_6$ | 19 | 67 | 103 | 171 | 203 | – | 183 | 150 | 131 | – |
| $I_7$ | 7 | 83 | 105 | 150 | 160 | 83 | – | 121 | 108 | 364 |
| $I_8$ | 11 | 71 | 92 | 121 | 139 | 150 | 121 | – | 140 | – |
| $I_9$ | 5 | 65 | 77 | 83 | 92 | 131 | 108 | 140 | – | 363 |

IMGR

FIG. 21

| Data | SC1 | | SC2 | | SC3 | | SCp | |
|---|---|---|---|---|---|---|---|---|
| | Tran | Rot | Tran | Rot | Tran | Rot | Tran | Rot |
| ISET1 | 0.046 | 0.062 | 0.024 | 0.032 | 0.023 | 0.029 | 0.016 | 0.026 |
| ISET2 | 0.036 | 0.024 | 0.020 | 0.018 | 0.017 | 0.021 | 0.013 | 0.012 |
| ISET3 | 0.056 | 0.060 | 0.041 | 0.049 | 0.035 | 0.027 | 0.016 | 0.021 |
| ISET4 | 0.055 | 0.039 | 0.045 | 0.051 | 0.027 | 0.020 | 0.015 | 0.017 |
| ISET5 | 0.031 | 0.021 | 0.030 | 0.020 | 0.029 | 0.017 | 0.019 | 0.015 |

METHOD OF GENERATING THREE-DIMENSIONAL MODEL AND DATA PROCESSING DEVICE PERFORMING THE SAME

CROSS-REFERENCE TO RELATED APPLICATION

This U.S. non-provisional application claims priority under 35 USC § 119 to Korean Patent Application No. 10-2022-0023364 filed on Feb. 23, 2022, in the Korean Intellectual Property Office (KIPO) and Korean Patent Application No. 10-2022-0074844 filed on Jun. 20, 2022 in the KIPO, the disclosures of which are incorporated by reference herein in their entirety.

BACKGROUND

1. Technical Field

Example embodiments relate generally to semiconductor integrated circuits, and more particularly to a method of generating a three-dimensional model and a data processing device performing the method.

2. Discussion of the Related Art

Recently reconstructing the real world in three-dimension has attracted much attention in the field of mobile systems. The mixed reality system such as augmented reality (AR), virtual reality (VR), etc. may combine virtual objects and the real world. The increasing market of digital mapping and metaverse will require further advanced technology. It is not easy to reconstruct an elaborate and reliable three-dimensional model from images captured by an image sensor.

SUMMARY

Some example embodiments provide a method of generating a three-dimensional model and data processing device, capable of efficiently reconstructing an elaborate three-dimensional model.

According to some example embodiments, a method of generating a three-dimensional model, includes, obtaining a plurality of input images such that each input image of the plurality of input images includes color data and depth data of a target, generating an image graph based on the color data of the plurality of input images such that the image graph includes correlation values between the plurality of input images, determining a registration order of the plurality of input images based on the image graph, sequentially generating pose information of each input image with respect to the plurality of input images based on the registration order and the depth data of the plurality of input images, sequentially registering the plurality of input images as registered images such that each registered image includes the pose information and reconstructing the three-dimensional model of the target based on the registered images.

According to some example embodiments, a method of generating a three-dimensional model, includes, obtaining a plurality of input images such that each input image of the plurality of input images includes color data and depth data of a target, extracting two-dimensional feature points included in each input image based on the color data of each input image, generating an image graph based on matching information of the two-dimensional feature points such that the image graph includes correlation values between the plurality of input images, determining a registration order of the plurality of input images based on the image graph, generating virtual depth data based on the depth data of the input images that are registered already, generating pose information of a present input image to be registered next to the input images that are registered already based on the virtual depth data and the depth data of the input images that are registered already, sequentially registering the plurality of input images as registered images such that each registered image includes the pose information and reconstructing the three-dimensional model of the target based on the registered images.

According to some example embodiments, a data processing device includes processing circuitry configured to receive a plurality of input images such that each input image of the plurality of input images includes color data and depth data of a target, generate an image graph based on the color data of the plurality of input images such that the image graph includes correlation values between the plurality of input images, determine, a registration order of the plurality of input images based on the image graph, sequentially generate pose information of each input image with respect to the plurality of input images based on the registration order and the depth data of the plurality of input images, sequentially register, the plurality of input images as registered images such that each registered image includes the pose information, and reconstruct a three-dimensional model of the target based on the registered images.

The method and data processing device according to some example embodiments may generate the exact or near exact pose information and reconstruct the elaborate three-dimensional model by determining the registration order based on the color data and sequentially generating the pose information of the input images according to the registration order using the registered images.

In addition, the method and the data processing device according to some example embodiments may estimate the exact or near exact pose information with respect to both cases of large motion and small motion by using both of the color data and the depth data.

Further, the method and data processing device according to some example embodiments may supplement deficient images and remove the noisy images conveniently by determining the registration order based on the image graph representing the correlation degrees between the input images.

BRIEF DESCRIPTION OF THE DRAWINGS

Example embodiments of the present disclosure will be more clearly understood from the following detailed description taken in conjunction with the accompanying drawings. The patent or application file contains at least one drawing executed in color. Copies of this patent or patent application publication with color drawing(s) will be provided by the Office upon request and payment of the necessary fee.

FIGS. 8 and 9 are diagrams illustrating example embodiments of an image graph in a method of generating a three-dimensional model according to some example embodiments.

FIGS. 11, 12 and 13 are diagrams for describing an example embodiment of determining a registration order of FIG. 10.

FIGS. 20A, 20B, 21 and 22 are diagrams illustrating effects of a method of generating a three-dimensional model according to some example embodiments.

FIG. 25 is a diagram illustrating an example embodiment of a pixel array included in the sensing unit of FIG. 24.

FIGS. 27A and 27B are diagrams illustrating some example embodiments of a pixel array included in the sensing unit of FIG. 26

DETAILED DESCRIPTION OF THE EXAMPLE EMBODIMENTS

Figure 1:
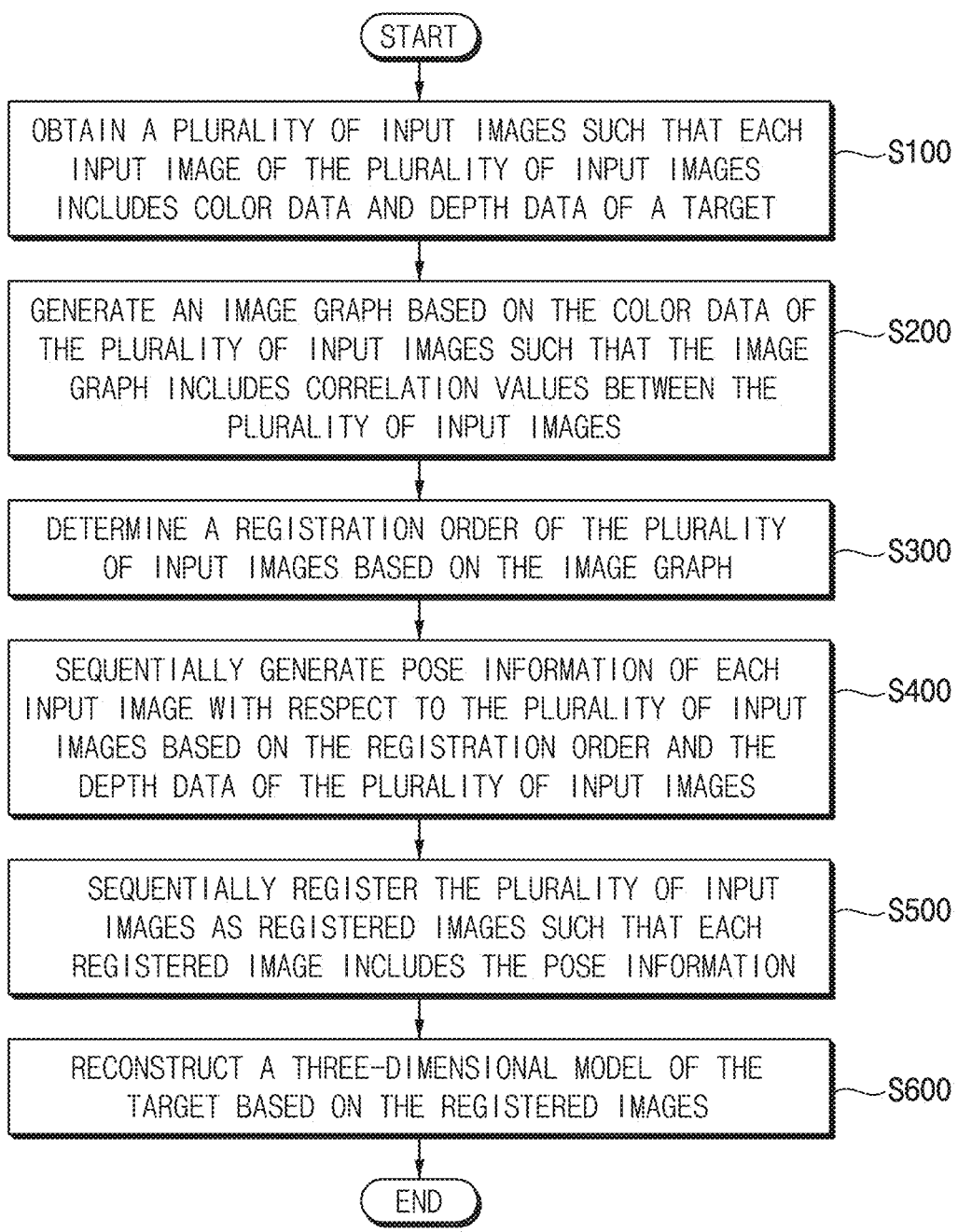
FIG. 1 is a flowchart illustrating a method of generating a three-dimensional model according to some example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a flowchart illustrating a method of generating a three-dimensional model according to some example embodiments.

Referring to FIG. 1, a plurality of input images may be obtained such that each input image of the plurality of input images includes color data and depth data of a target (S100). The different input images of the plurality of input images may include data commonly of at least a portion of the target. The target may be a single object or a set of objects such as indoor structure. As will be described below with reference to FIGS. 23 through 31, the color data may represent two-dimensional color information of the target and the depth data may represents distance information between the target and a camera or an image sensor.

In some example embodiments, the plurality of input images may be captured by a plurality of cameras as will be described below with reference to FIG. 4A or the plurality of input images may be sequentially captured by a single camera as will be described below with reference to FIG. 4B.

An image graph may be generated based on the color data of the plurality of input images such that the image graph includes correlation values between the plurality of input images (S200). In some example embodiments, two-dimensional feature points included in each input image may be extracted based on the color data of each input image, and the correlation values may be determined based on mapping relations of the two-dimensional feature points. The extraction of the two-dimensional feature points and generation of matching information indicating the mapping relations may be performed using various schemes. Some example embodiments of generating the image graph based on the two-dimensional feature points will be described below with reference to FIGS. 6 through 9.

A registration order of the plurality of input images may be determined based on the image graph (S300). The registration order may be determined such that the input image correlated more with the other input images may be registered earlier. Some example embodiments of determining the registration order will be described below with reference to FIGS. 10 through 13.

Pose information of each input image may be sequentially generated with respect to the plurality of input images based on the registration order and the depth data of the plurality of input images (S400). The plurality of input images may be sequentially registered as registered images such that each registered image includes the pose information (S500).

As will be described below with reference to FIGS. 14A and 14B, the pose information may include a position and an orientation of a camera that captured a corresponding input image. The registered image indicates the input image with the generated pose information, and the registered image may include the color data, the depth data and the pose information.

In some example embodiments, virtual depth data may be generated based on the depth data of the input images that are registered already, and the pose information of a present input image to be registered next to the input images that are registered already may be generated based on the virtual depth data and the depth data of the present input image. Some example embodiments of generating the pose information will be described below with reference to FIGS. 15 through 18.

A three-dimensional model of the target may be reconstructed based on the registered images (S600). As will be described below with reference to FIG. 19, the reconstruction of the three-dimensional model may include a sparse reconstruction corresponding to a three-dimensional point cloud and a dense reconstruction corresponding to a surface reconstruction of the three-dimensional model.

Figure 2:
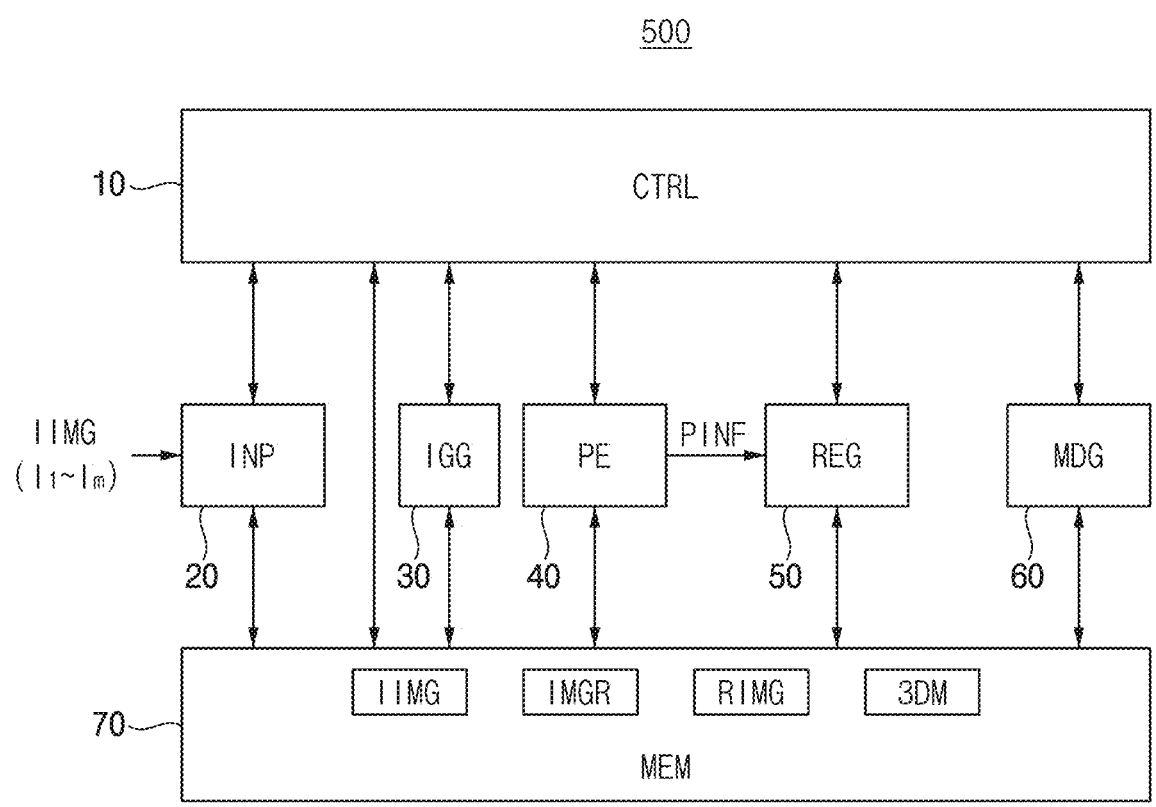
FIG. 2 is a block diagram illustrating a data processing device performing a method of generating a three-dimensional model according to some example embodiments.

FIG. 2 is a block diagram illustrating a data processing device performing a method of generating a three-dimensional model according to some example embodiments.

Referring to FIG. 2, a data processing device 500 may include a controller CTRL 10, an input circuit INP 20, an image graph generator IGG 30, a pose estimator PE 40, a registration agent REG 50, a model generator MDG 60, and a memory device MEM 70.

The input circuit 20 may receive a plurality of input images, for example, m input images $I_1$~$I_m$ such that each input image of the plurality of input images includes color data and depth data of a target. The input circuit may have various configurations configured to communicate with an external device such as camera. The received input images IIMG may be stored in the memory device 70.

The image graph generator 30 may generate an image graph based on the color data of the plurality of input images such that the image graph includes correlation values between the plurality of input images IIMG. The image graph generator 60 may access the memory device 70 to read the input images IIMG and store the generated image graph IMGR.

The controller 10 may control overall operations of the data processing device 500. In addition, the controller 10 may determine a registration order of the plurality of input images IIMG based on the image graph IMGR. In some example embodiments, the controller 10 may load the image graph IMGR inside the controller 10 and control the operations of the data processing device 10 using the loaded image graph IMGR. According to the registration order, the controller 10 may provide the pose estimator 40 with the input images that are registered already and the present input image to be registered next.

The pose estimator 40 may sequentially generate pose information PINF of each input image with respect to the plurality of input images IIMG based on the registration order and the depth data of the plurality of input images IIMG.

The registration agent 50 may sequentially register the plurality of input images IIMG as registered images RIMG such that each registered image includes the pose information PINF. In some example embodiments, the registration agent 50 may generate the registered images RIMG by adding the pose information PINF to the corresponding input image. In some example embodiments, the registration agent 50 may generate each registered image by converting each input image with respect to a reference coordinate system based on the pose information PINF. The generated registered images RIMG may be sequentially stored in the memory device 70.

The model generator 60 may reconstruct a three-dimensional model 3DM of the target based on the registered images RIMG, and the generated three-dimensional model 3DM may be stored in the memory device 70. In addition, the three-dimensional model 3DM may be provided to an external device through the interface in the input circuit 20.

The memory device 70 may store the plurality of input images IIMG, the image graph IMGR, the registered images RIMG, the three-dimensional model 3DM, and so on. The memory device 70 may be a memory device dedicated to the data processing device 500 or a common memory device of a system including the data processing device 500.

As such, the method and data processing device 500 according to some example embodiments may generate the exact pose information PINF and reconstruct the elaborate three-dimensional model 3DM by determining the registration order based on the color data and sequentially generating the pose information PINF of the input images according to the registration order using the registered images RIMG.

Figure 3:
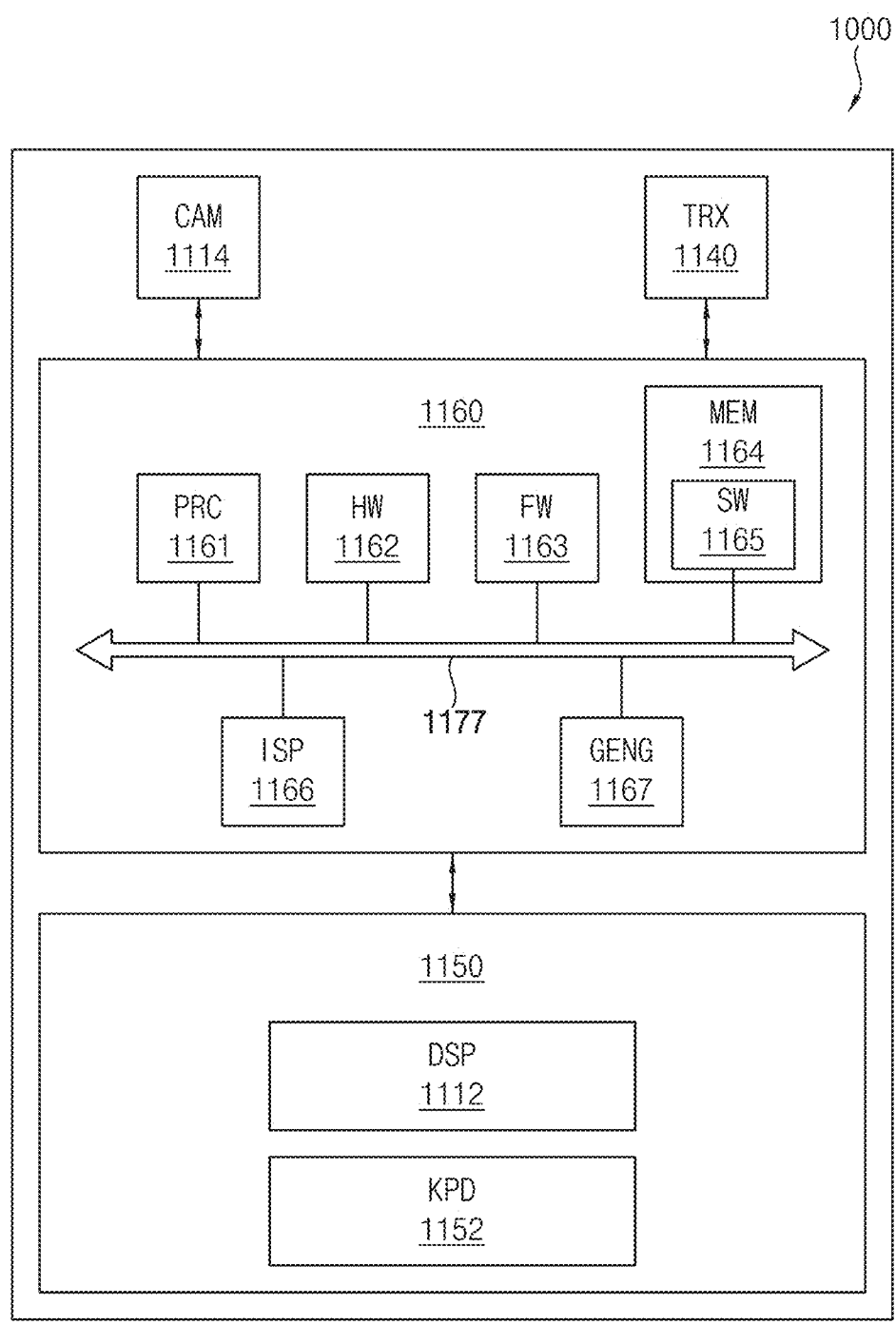
FIG. 3 is a block diagram illustrating a system according to some example embodiments.

FIG. 3 is a block diagram illustrating a system according to some example embodiments.

Referring to FIG. 3, a system 1000 may include a camera module (CAM) 1114, a transceiver (TRX) 1140, a control unit 1160 and a user interface 1150.

The camera module 1114 may include at least one camera or an image sensor configured to capture and provide the input images. The camera module 1114 may include multiple cameras respectively providing one or more of the input images. Alternately, the camera module 1114 may include a single camera providing the input images.

The transceiver 1140 may provide whatever connectivity the system 1000 requires or is desirable for connectivity. Such connectivity may include wired and/or wireless links to other networks such as the Internet, a cellular network, etc.

The user interface 1150 may include input devices (KPD) 1152 such as a keyboard, a keypad, etc. and output devices (DSP) 1112 such as a display device capable of displaying images captured by the camera module 1114. If appropriate to particular designs, a virtual keypad may be integrated into the display device 1112 having touch screen/sensor technology in order to obviate the input device 1152.

The control unit 1116 may include a general purpose processor (PRC) 1161, a hardware device (HW) 1162, a firmware device (FW) 1163, a memory (MEM) 1164, an image signal processor (ISP) 1166, a graphics engine (GENG) 1167, and a bus 1177. The control unit 1160 may perform the method of generating a three-dimensional mode according to some example embodiments. That is, the control unit 1160 may be configured to perform functions of the data processing device 500 described in FIG. 2, for example.

Here, it should be noted that some example embodiments may be variously implemented in hardware, firmware and/or software.

In some example embodiment, the method of generating a three-dimensional model according to some example embodiments may be performed using the image signal processor 1166. In some example embodiments, the method of generating a three-dimensional model may be performed according to a program instructions executed by a processing device. The program instructions may be stored in the memory 1164 as software SW 1165, and the program instructions may be performed by the general purpose processor 1161 and/or the image signal processor 1166.

To execute the program instructions, for example, the general purpose processor 1161 may retrieve or fetch the program instructions from an internal register, an internal cache or the memory 1164 and decode and execute them. During or after execution of the program instructions, the general purpose processor 1161 may write one or more results (which may be intermediate or final results) of the program instructions to the internal register, internal cache or the memory 1164.

The system 1000 may be a computer system taking one of many possible forms. For example, the system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these.

The program instructions for implementing a method of generating a three-dimensional model according to some example embodiments may be stored in a computer-readable non-transitory storage medium or media. The computer-readable non-transitory storage medium may include one or more semiconductor-based or other integrated circuits (ICs), such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 4A:
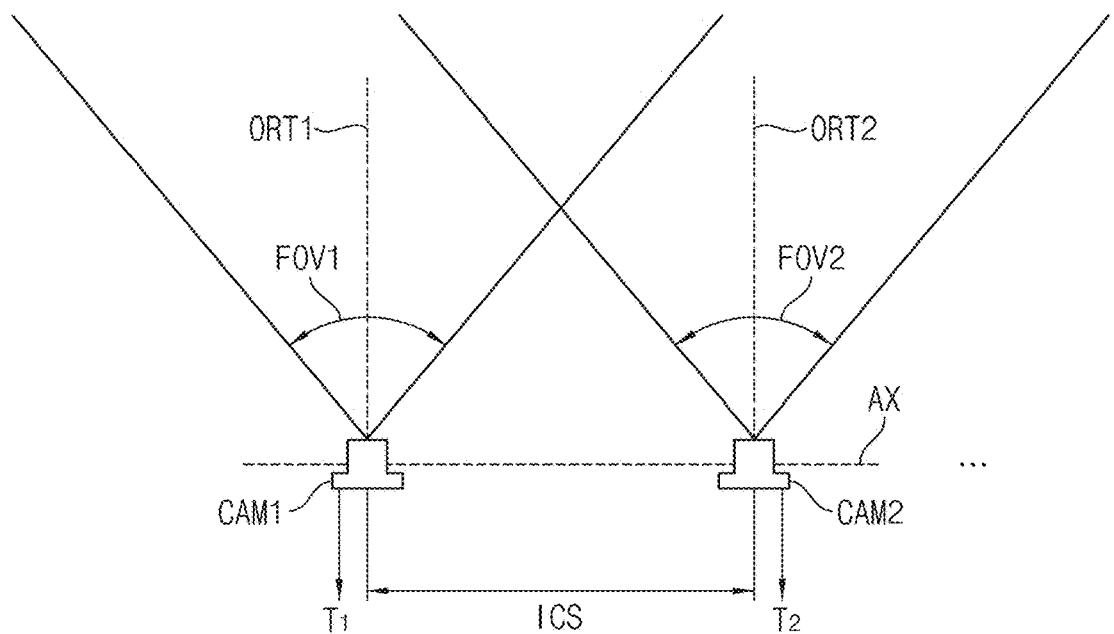
FIGS. 4A and 4B are diagrams illustrating example embodiments of providing input images to be merged to generate a three-dimensional model according to some example embodiments.
Figure 4B:
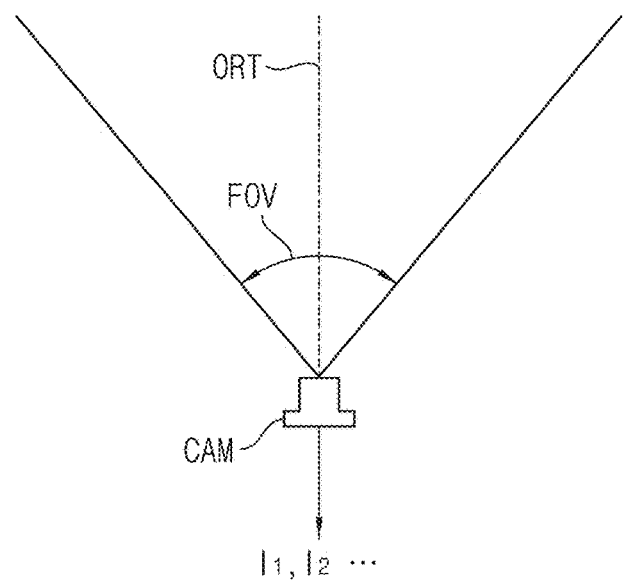

FIGS. 4A and 4B are diagrams illustrating some example embodiments of providing input images to be merged to generate a three-dimensional model according to some example embodiments.

FIG. 4A illustrates an example in which an array of cameras including a first camera CAM1 and a second camera CAM2 disposed along an axis (AX). The input images described above may include images I1 and I2, respectively captured by the cameras CAM1 and CAM2. In convenience of illustration, only two (2) cameras CAM1 and CAM2 are shown in FIG. 4A. However, those skilled in the art will recognize that three or more cameras may be used in other example embodiments.

In some example embodiments, each of (or alternatively, at least one of) the cameras CAM1 and CAM2 may include an image sensor configured to capture individual images or a series of images (e.g., a video). For example, the cameras CAM1 and CAM2 may include a charge-coupled device (CCD) image sensor or a complementary metal-oxide-semiconductor (CMOS) active-pixel image sensor.

Each camera in the array of cameras has a particular field of view (FOV) that depends on a variety of factors such as; relative camera position, focal length, magnification in use, camera size, etc. As illustrated in FIG. 4A, the first camera CAM1 has a first field of view FOV1 and the second camera CAM2 has a second field of view FOV2 different from the first field of view FOV1.

In this regard, the field of view for a camera may refer to a horizontal, vertical, or diagonal extent of a particular scene imaged by the camera. Objects within the field of view of the camera may be captured by an image sensor of the camera, and objects outside the field of view may not appear on the image sensor.

A camera may have an orientation that represents an angle or a direction in which the camera is pointing. As illustrated in FIG. 4A, the camera CAM1 may have a first orientation ORT1 and the camera CAM2 may have a second orientation ORT2 different from the first orientation ORT1.

Depending on an inter-camera spacing ICS, the field of views FOV1 and FOV2 and the orientations ORT1 and ORT2, an overlapping portion of a first image I1 and a second image I2, respectively captured by the cameras CAM1 and CAM2, may vary. Accordingly, synchronization or coordinate-synchronization is required or desired by aligning the images I1 and I2 to a same two-dimensional plane in advance to merge the images I1 and I2 efficiently.

As illustrated in FIG. 4B, the input images later merged by some example embodiments of the inventive concepts may include a first image I1 and a second image I2, sequentially captured by a single camera (CAM). For example, the images I1 and I2 may be images captured in a serial capturing mode or images that are oversampled to enhance image quality. In these cases, the time interval may occur between the images I1 and I2, and the overlapping portion of the images I1 and I2 may vary due to hand movement by the user, etc. As the case of FIG. 4A, synchronization (or coordinate-synchronization) is required or desired by aligning the images I1 and I2 to the same two-dimensional plane in advance to merge the images I1 and I2 efficiently.

Figure 5:
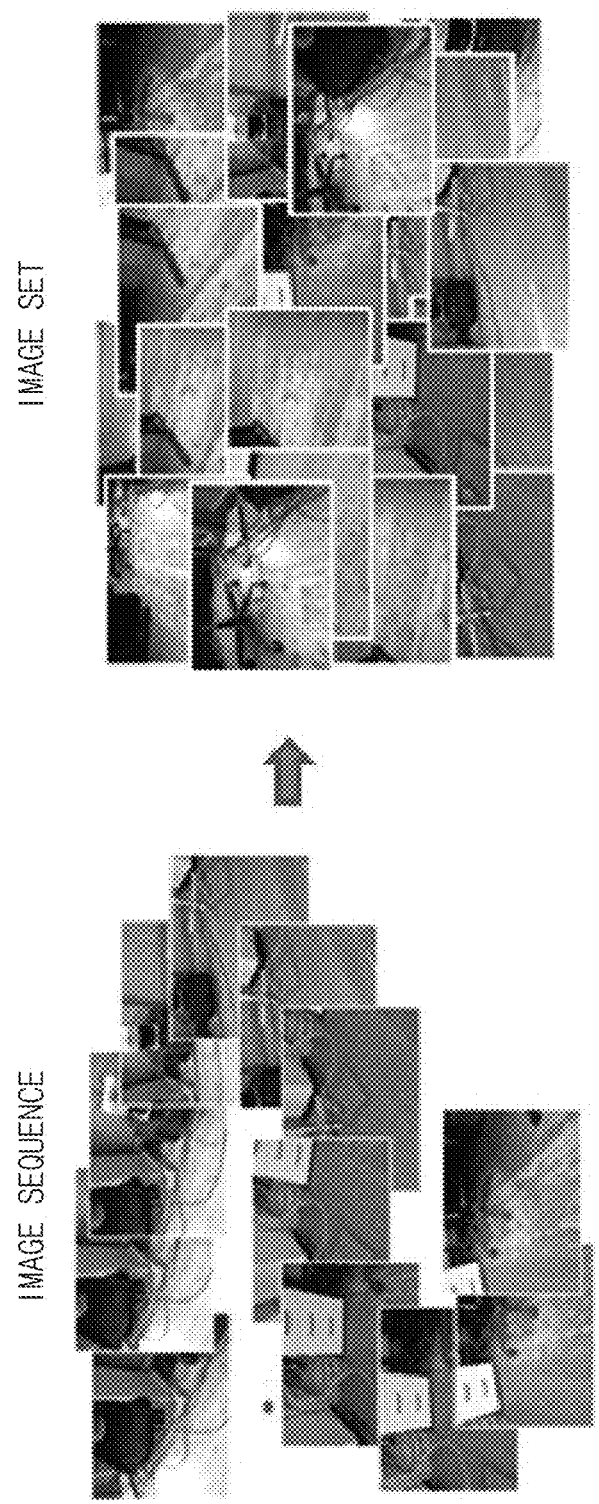
FIG. 5 is a diagram illustrating a tracking-based image sequence and an image set in a method of generating a three-dimensional model according to some example embodiments.

FIG. 5 is a diagram illustrating a tracking-based image sequence and an image set in a method of generating a three-dimensional model according to some example embodiments.

The tracking-based method of generating a three-dimensional model is performed based on an image sequence. In the tracking-based method, the pose information are generated by processing the two images that are sequential temporally. Accordingly, if there is degeneration or omission of the input images, obtaining the image sequence has to be resumed or the quality of the generated three-dimensional model may be degraded.

In contrast, according to some example embodiments, an arbitrary image set as illustrated in FIG. 5 may be used to generate a three-dimensional model because the processing order or the registration order is determined based on the correlation degrees between the input images regardless of the times of capturing the input images. As such, the method and data processing device according to some example embodiments may supplement deficient images and remove the noisy images conveniently by determining the registration order based on the image graph representing the correlation degrees between the input images.

As one of the conventional schemes, the simultaneous localization and mapping (SLAM) focuses on real-time tracking and reconstruction from sequential image sets. SLAM systems are optimized or improved for camera tracking with a spare point cloud, so they are only to produce a sparse reconstruction and a dense reconstruction is impossible. The KinectFusion algorithm provides volumetric dense reconstruction of a small sized scene by combining a large amount of individual depth information into a single volumetric reconstruction. However, the KinectFusion algorithm estimates the pose information by frame-to-model alignment using only depth information, which can easily fail pose estimation when there are large movements between consecutive frames. The conventional method by combining the color data and the iterative closest point (ICP) scheme may estimate relatively exact pose information, but the accuracy of the pose information is degraded because the accuracy of the three-dimensional point cloud is lowered when the camera motion is small. As other conventional schemes, the incremental structure to motion (SFM) or the visual SFM may show better performance but the SFM schemes are limited in their ability to implement small scale reconstruction system such as the hand-held three-dimensional scan system, because a large baseline between image pairs is required or desired due to the accuracy of the three-dimensional points and pose estimation.

According to some example embodiments, the reconstruction based on the color data for robustness may be combined with the reconstruction based on the color data and the depth data for accuracy. In particular, some example embodiments may be applied to a hand-held scanning system.

As such, the method and the data processing device according to some example embodiments may estimate the exact pose information with respect to both cases of large motion and small motion by using both of the color data and the depth data.

Figure 6:
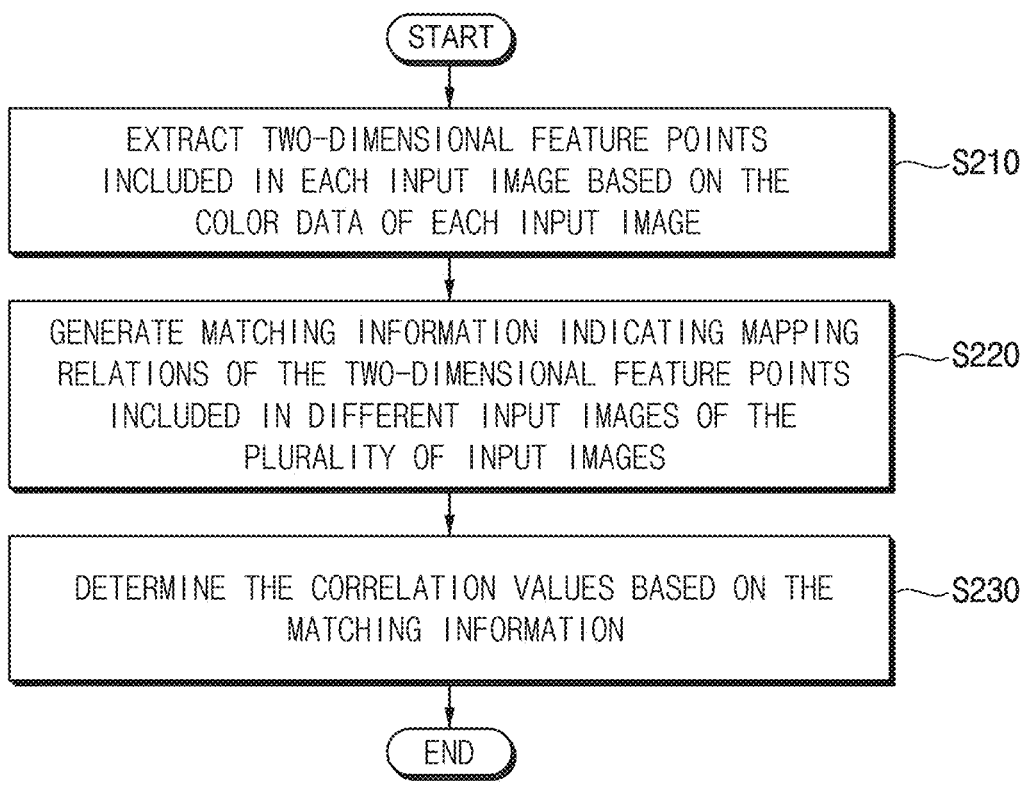
FIG. 6 is a flowchart illustrating an example embodiment of generating an image graph in a method of generating a three-dimensional model according to some example embodiments.

FIG. 6 is a flowchart illustrating an example embodiment of generating an image graph in a method of generating a three-dimensional model according to some example embodiments.

Referring to FIGS. 2 and 6, the image graph generator 30 may extract two-dimensional feature points included in each input image based on the color data of each input image (S210). The extraction of the two-dimensional feature points will be described below with reference to FIG. 7. The image graph generator 30 may generate matching information indicating mapping relations of the two-dimensional feature points included in different input images of the plurality of input images (S220), and determine the correlation values based on the matching information (S230). The determination of the correlation values will be described below with reference to FIGS. 8 and 9.

Figure 7:
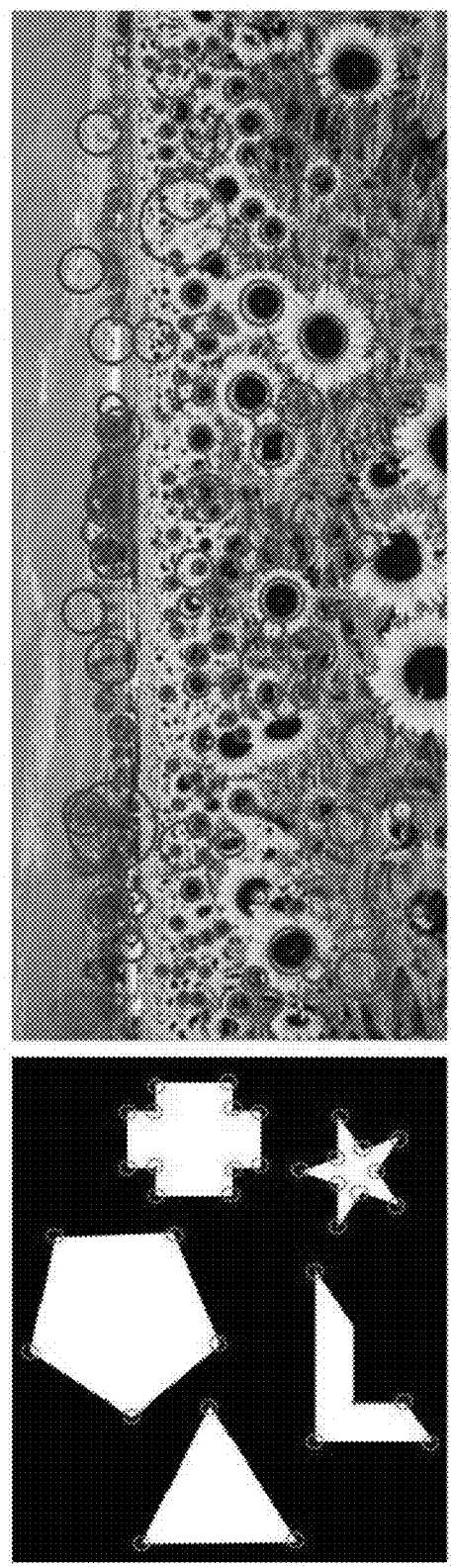
FIG. 7 is a diagram illustrating examples of extracting feature points in a method of generating a three-dimensional model according to some example embodiments.

FIG. 7 is a diagram illustrating examples of extracting feature points in a method of generating a three-dimensional model according to some example embodiments.

To tracking and/or recognizing an object, image matching may be implemented by extracting feature points in images to be merged. The feature points may be understood as key points or points of interest.

In order to match corresponding image portions, it is necessary to extract appropriate feature points that may be readily recognized (or detected) and differentiated from the image background. For example, conditions associated with appropriate feature points may include a high degree of discernment even though the shape and/or location of an object, camera parameter, illumination, etc. is (are) changed. One example of an appropriate feature point is a corner point, but many different approaches may be used. However, most feature point extraction approaches are based on corner point extraction(s) such as the Harris Corner and scale-invariant feature points (SIFT) corner also illustrated in FIG. 7.

In some example embodiments, the feature point detection and point matching may be performed on grayscale versions of input images, and a particular contrast may be applied to the input images in a separate operation or through a look-up table. In some example embodiments, feature point detection may be performed globally on the images using local contrast enhancement. Local contrast enhancement increases "local" contrast, while at the same time preventing or hindering an increase in "global" contrast, thereby protecting large-scale shadow/highlight detail. For example, local contrast gradients may be indicative of an edge, corner, or "blob" that corresponds to a feature. Features of the images may be detected using a feature detection algorithm such as, for example, scale-invariant feature transform (SIFT), speeded up robust features (SURF), or oriented FAST and Rotated BRIEF (ORB), where FAST stands for "features from accelerated segment test" and BRIEF stands for "binary robust independent elementary features." In some example embodiments, a feature point detection process may detect one or more feature points. For example, feature points may be detected by taking a difference of multiple Gaussian smoothing operations. Furthermore, the position of the feature points and the contrast values of each feature point for each search region may be stored.

In some example embodiments, a size of an area used to match feature points in different images may be set according to a size of images. In some example embodiments, a geometry of camera system may be known, and based on the known camera-system geometry, an approximate number of pixels of the search regions and overlap areas of the images may be known a priori. For example, the location and orientation of cameras of the camera system may be fixed relative to one another, the overlap between the cameras may be known.

In some example embodiments, determining corresponding pairs of the feature points respectively included in the different input images may be performed using a nearest-neighbor search algorithm. For example, a nearest-neighbor search algorithm may identify patterns of feature points within each search region of overlap area of one image that match corresponding patterns of feature points within each search region of the overlap area of another image. In some example embodiments, a nearest-neighbor algorithm may use a search radius around each feature point to determine the pairs of corresponding feature points. For example, a search area may have a radius of 32 pixels, 64 pixels, or any suitable radius, or a search area may have a size of 32 pixels×32 pixels, 64 pixels×64 pixels, or any suitable size. In some example embodiment, a secondary refinement may be used to realign the pairs of corresponding feature points before a final homography calculation.

FIGS. 8 and 9 are diagrams illustrating some example embodiments of an image graph in a method of generating a three-dimensional model according to some example embodiments.

FIG. 7 illustrates an example of matching information MINF of feature points Xij respectively included in the first through fifth images ($I_0$~$I_4$). Here, the feature points in the same row may correspond to the same location of the captured scene. For example, it will be understood form the matching information MINF that the feature point X02 of the first image $I_0$, the feature point $X_{11}$ of the second image $I_1$, the feature point $X_{22}$ of the third image $I_2$, and the feature point $X_{32}$ of the fourth image $I_3$ correspond to one another and the fifth image $I_4$ has no corresponding feature point. The correlation values between the different input images may be determined through the matching information MIFN.

FIG. 9 illustrates an example of an image graph IMGR including the correlation values between first through ninth input images $I_1$~$I_9$ that are to be merged for a three-dimensional model.

The image graph generator 30 of FIG. 2 may determine the correlation values based on the matching information as described with reference to FIG. 8. In some example embodiments, the image graph generator 30 may determine, as the correlation value $M_{i,j}$ between two input images $I_i$ and $I_j$, a number of matched pairs of the two-dimensional feature points included in the two input images $I_i$ and $I_j$. The correlation value $M_{i,j}$ is equal to the correlation value $M_{j,i}$ because the correlation value represents the relation between the two input images $I_i$ and $I_j$. For example, $M_{3,4}=M_{4,3}=145$ in the example of FIG. 9.

In some example embodiments, the controller 10 may determine, based on the image graph IMGR, a noisy input image among the plurality of input images such that the correlation values between the noisy input image and other input images are smaller than a threshold value and discard the noisy image. In the example of FIG. 9, the threshold value may be set to 25, and the first input image $I_1$ may be determined as a noisy input image because the correlation values 2, 15, 13, 11, 19, 7, 11 and 5 between the first input image $I_1$ and the other input images $I_2$~$I_9$ are smaller than the threshold value of 25.

Figure 10:
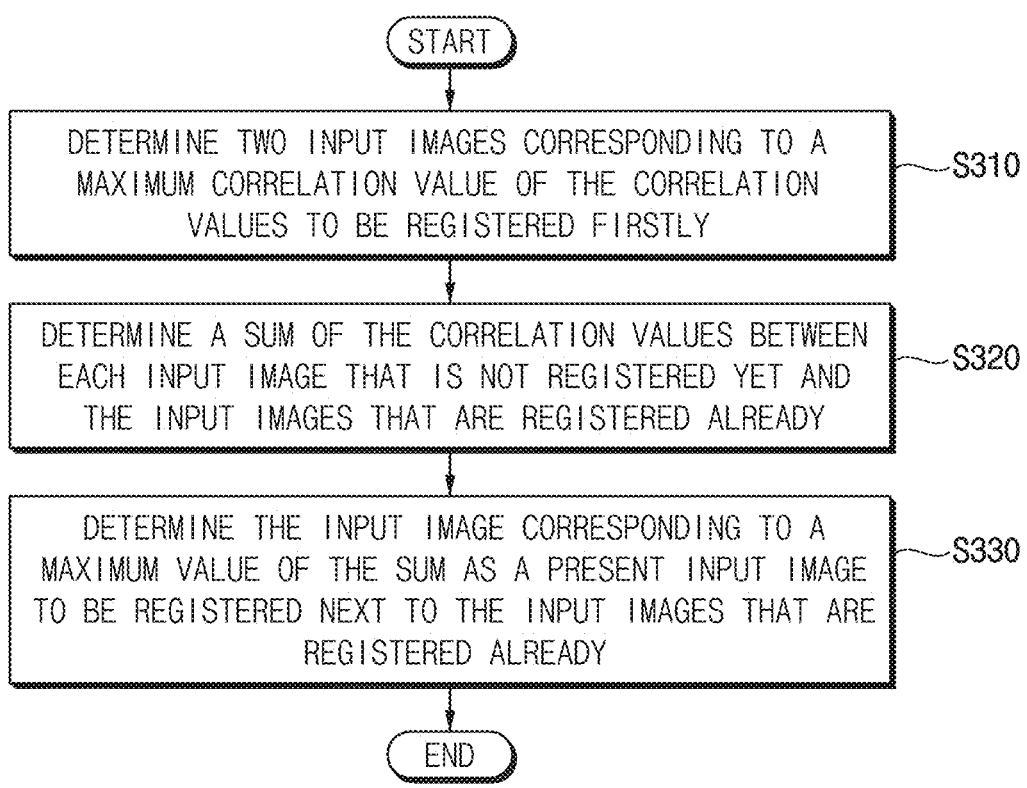
FIG. 10 is a flowchart illustrating an example embodiment of determining a registration order in a method of generating a three-dimensional model according to some example embodiments.

FIG. 10 is a flowchart illustrating an example embodiment of determining a registration order in a method of generating a three-dimensional model according to some example embodiments, and FIGS. 11, 12 and 13 are diagrams for describing an example embodiment of determining a registration order of FIG. 10.

Referring to FIGS. 2 and 10, the controller 10 may determine two input images corresponding to a maximum or highest correlation value of the correlation values to be registered firstly (S310) (e.g., determining two of the input images to register first based on the correlation values).

For example, as illustrated in FIG. 11, the correlation value $M_{5,6}$ of the fifth and sixth input images $I_5$ and $I_6$ may be the maximum or highest correlation values among all of the correlation values. The controller 10 may determine that the fifth and sixth input images $I_5$ and $I_6$ have to be registered firstly.

The controller 10 may determine a sum of the correlation values between each input image that is not registered yet and the input images that are registered already (S320) and determine the input image corresponding to a maximum or highest value of the sum as a present input image to be registered next to the input images that are registered already (S330).

For example, as illustrated in FIG. 12, when the fifth and sixth input images $I_5$ and $I_6$ are registered already, the sum CSM of the correlation values between each of the images $I_1$, $I_2$, $I_3$, $I_4$, $I_7$, $I_8$ and $I_9$ and the registered input images $I_5$ and $I_6$. For example, the sum CSM corresponding to the fourth input image $I_4$ that is not registered yet may be 62+171=133. The sum CSM of 289 corresponding to the eighth input image $I_8$ is the maximum or highest value of the sums CSM and the controller 10 may determine that the eighth input image $I_8$ is registered after the fifth and sixth input images $I_5$ and $I_6$ that are registered already.

After that, as illustrated in FIG. 13, when the fifth, sixth and eighth input images $I_5$, $I_6$ and $I_8$ are registered already, the sum CSM of the correlation values between each of the images $I_1$, $I_2$, $I_3$, $I_4$, $I_7$ and $I_9$ and the registered input images $I_5$, $I_6$ and $I_8$. For example, the sum CSM corresponding to the fourth input image $I_4$ that is not registered yet may be 62+171+121=354. The sum CSM of 364 corresponding to the seventh input image $I_7$ is the maximum or highest value of the sums CSM and the controller 10 may determine that the seventh input image $I_7$ is registered after the fifth, sixth and eighth input images $I_5$, $I_6$ and $I_8$ that are registered already.

The order of the input images to estimate the pose information PINF may largely affect the accuracy of the pose estimation. According to some example embodiments, the error accumulation of the pose estimation may be prevented and/or reduced due to improper order of pose estimation by determining the registration order or the order of pose estimation based on color data. As such, the exact or near exact pose information may be generated and the elaborate three-dimensional model may be reconstructed by determining the registration order based on the color data and sequentially generating the pose information of the input images according to the registration order using the registered images.

Figures 14A, 14B:
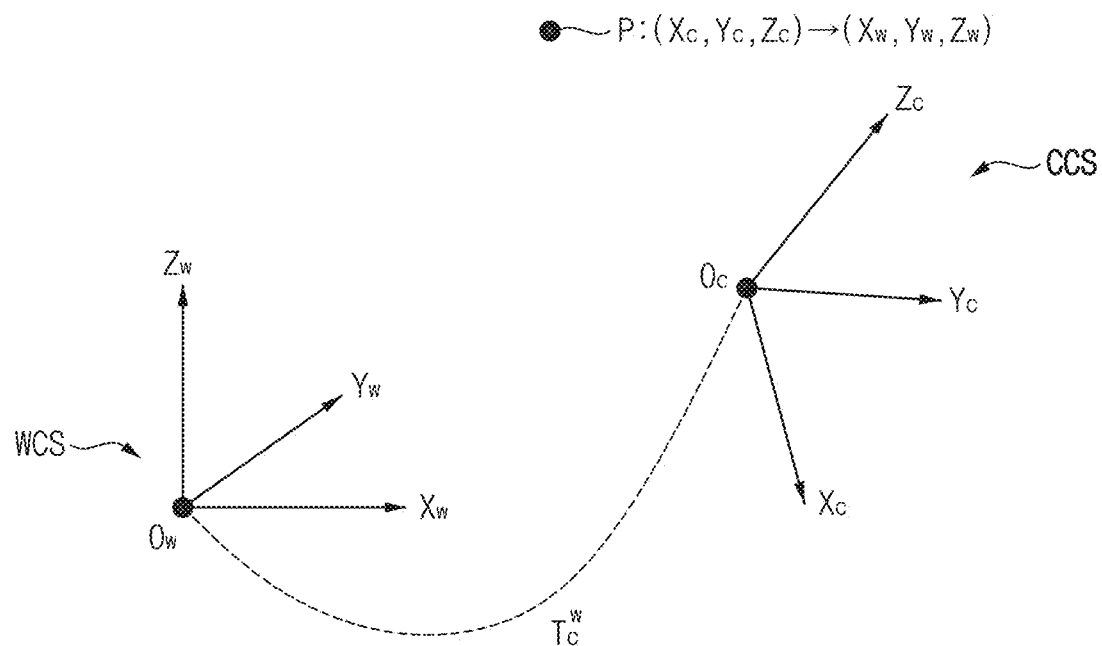
FIGS. 14A and 14B are diagrams for describing pose information in a method of generating a three-dimensional model according to some example embodiments.

FIGS. 14A and 14B are diagrams for describing pose information in a method of generating a three-dimensional model according to some example embodiments.

FIG. 14A illustrates an example of a reference coordinate system (or a world coordinate system) WCS and a camera coordinate system CCS corresponding to one input image. The position or the coordinate values of a point P may be represented by (Xw, Yw, Zw) by the reference coordinate system WCS and (Xc, Yc, Zc) by the camera coordinate system CCS. The coordinate values with respect to the different coordinate systems may be converted using the geometric conversion matrix $T_c^w$ as illustrated in FIG. 14B. In FIG. 14B, $r_{11}, r_{12}, r_{13}, r_{21}, r_{22}, r_{23}, r_{31}, r_{32}$ and $r_{33}$ represent the rotation of the camera coordinate system CCS with respect to the reference coordinate system WCS, and $t_x$, $t_y$, and $t_z$ represent the rotation of the camera coordinate system CCS with respect to the reference coordinate system WCS. The rotation and the translation correspond to the orientation and the position of the camera when the camera captures the corresponding input image. The above-described pose information PINF may be represented by such geometric conversion matrix $T_c^w$.

Figure 15:
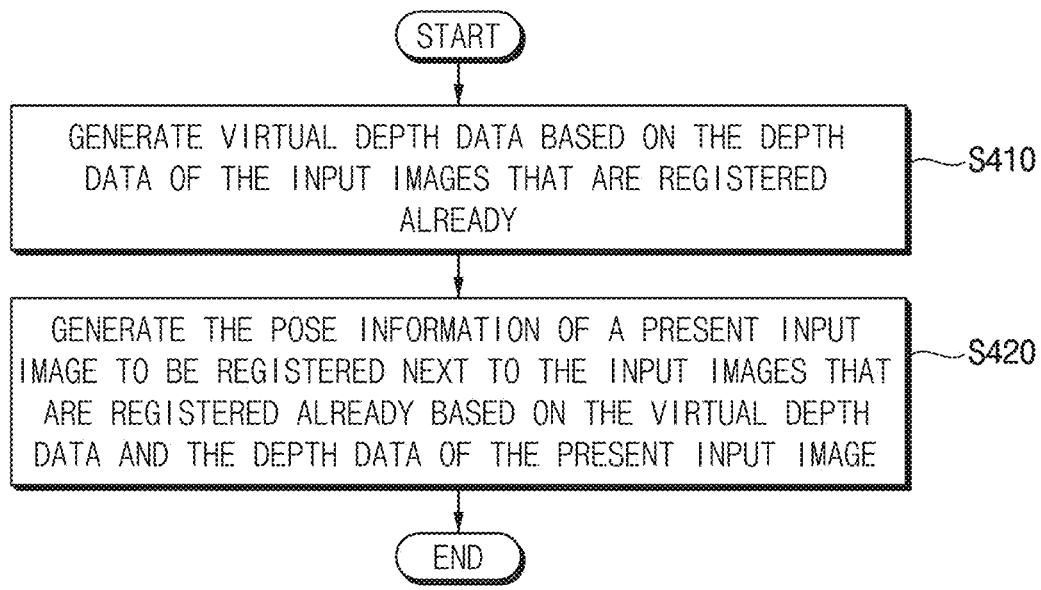
FIG. 15 is a flowchart illustrating an example embodiment of generating pose information in a method of generating a three-dimensional model according to some example embodiments.

FIG. 15 is a flowchart illustrating an example embodiment of generating pose information in a method of generating a three-dimensional model according to some example embodiments.

Referring to FIGS. 2 and 15, the pose estimator 40 may generate virtual depth data based on the depth data of the input images that are registered already (S410). The pose estimator 40 may generate the pose information of a present input image to be registered next to the input images that are registered already based on the virtual depth data and the depth data of the present input image (S420).

In the example of FIG. 13, the fifth, sixth and eighth input images $I_5$, $I_6$ and $I_8$ correspond to the registered input images that are registered already, and the seventh input image $I_7$ corresponds to the present input image that is registered by generating the pose information PINE In this case, the pose estimator 40 may generate the virtual depth data for the pose estimation of the seventh input image $I_7$ based on the depth data of the registered input images $I_5$, $I_6$ and $I_8$.

In some example embodiments, the pose estimator 40 may perform an iterative closest point (ICP) algorithm based on the virtual depth data and the depth data of the present input image. The ICP algorithm plays an important role in matching and compensation of correction error. The ICP algorithm may match two point clouds by repeatedly and alternately performing the corresponding point search and the pose estimation. Fundamentally the ICP algorithm may be performed by calculating solutions such that a cost function is minimized or reduced. Example embodiments are not limited to a particular ICP algorithm, and various ICP algorithms may be applied to some example embodiments.

In the tracking-based pose estimation, the pose of the present input image is estimated based on the depth data of the one input image that has the estimated pose and is temporally adjacent to the present input image. In contrast, according to some example embodiments, the pose of the present input image is estimated based on the virtual depth data, which is generated based on the depth data of the registered images having the pose information PINF. As described above, the registered input images may have the exact or near exact pose information PINF generated according to the registration order based on the color data. The accuracy of the pose estimation of the present input image may be enhanced using the depth data of the registered input images. The ICP based on such virtual depth data may be referred to as "bundle ICP".

Figure 16:
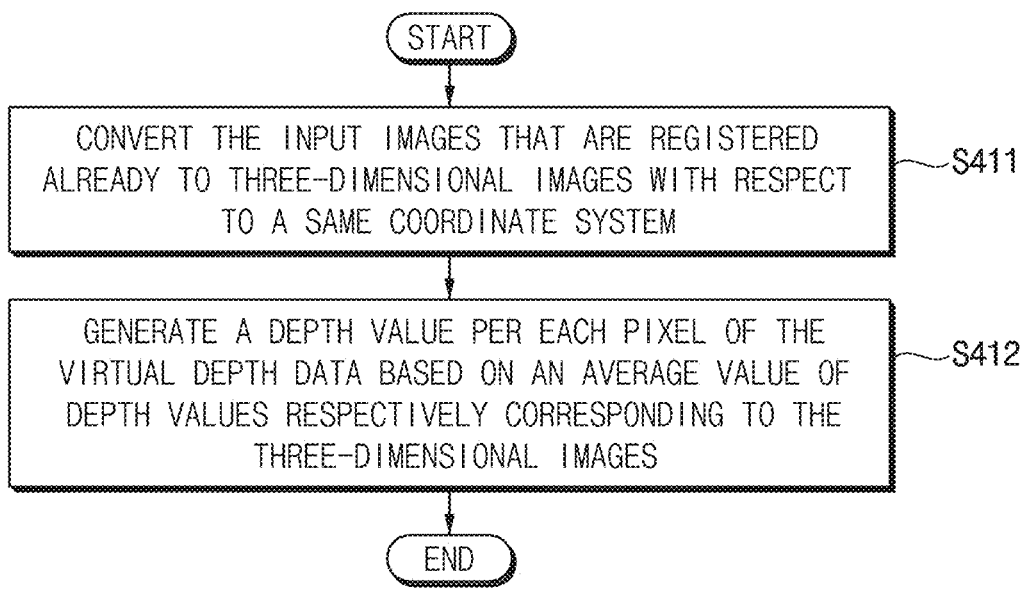
FIG. 16 is a flowchart illustrating an example embodiment of generating depth data in a method of generating a three-dimensional model according to some example embodiments.

FIG. 16 is a flowchart illustrating an example embodiment of generating depth data in a method of generating a three-dimensional model according to some example embodiments.

Referring to FIGS. 2 and 16, the pose estimator 40 may convert the input images that are registered already to three-dimensional images with respect to a same coordinate system (S411), and generate a depth value per each pixel of the virtual depth data based on an average value of depth values respectively corresponding to the three-dimensional images (S412).

Such generation of the virtual depth data may be represented by Expression 1.

$$I_{vir}^d(X_w) = \Sigma_{I \in I_{reg}} Wi \cdot D(X_w^i), X_w^i \text{ in } I_i \qquad \text{Expression 1}$$

In Expression 1, $I_{reg}$ indicates a registered input image, $I_i$ indicates an i-th input image, $X_w^i$ indicates a pixel of the i-th input image, $X_w$ indicates a pixel of the virtual depth data, $D(X_w^i)$ indicates a depth value per pixel of the three-dimensional image, $I_{vir}^d(X_w)$ indicates a depth value per pixel of the virtual depth data, and $W_i$ indicates a weight value corresponding the i-th input image.

In some example embodiments, the same coordinate system may be a reference coordinate system. In some example embodiments, the same coordinate system may be a coordinate system corresponding to initial pose information as will be described below with reference to FIG. 17.

In some example embodiments, the average value of the depth values may be obtained by an arithmetic average. In other words, the weight value Wi in Expression 1 may be 1/N where N is the number of the registered input images included in the calculation of Expression 1.

In some example embodiments, the average value of the depth values may be obtained by a weighted average using weight values corresponding to the correlation values between the present input image and the input images that are registered already. In other words, the weight value Wi in Expression 1 may be a ratio of the correlation value of each registered input image with respect to a sum of the correlation values between the present input image and the registered input images.

Figure 17:
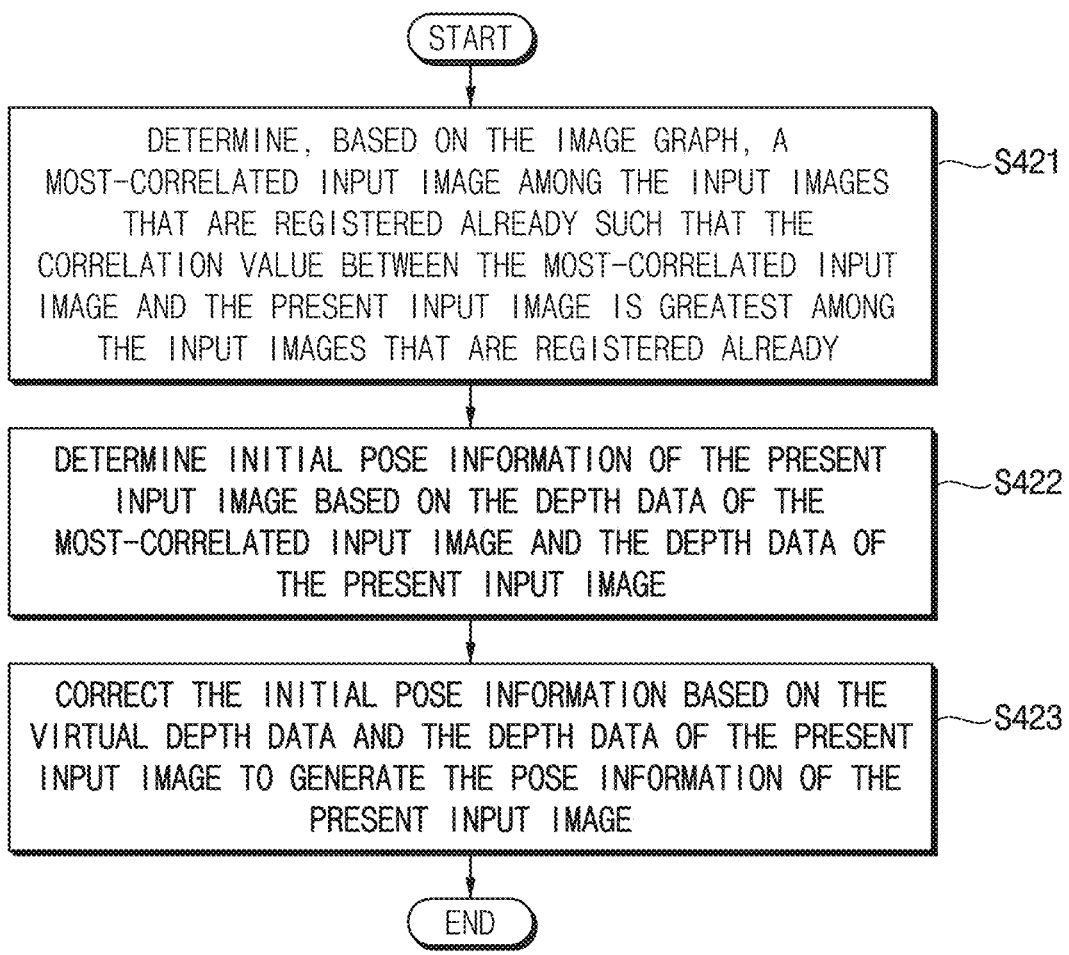
FIGS. 17 and 18 are flowcharts illustrating an example embodiment of generating pose information of a present input image in a method of generating a three-dimensional model according to some example embodiments.
Figure 18:
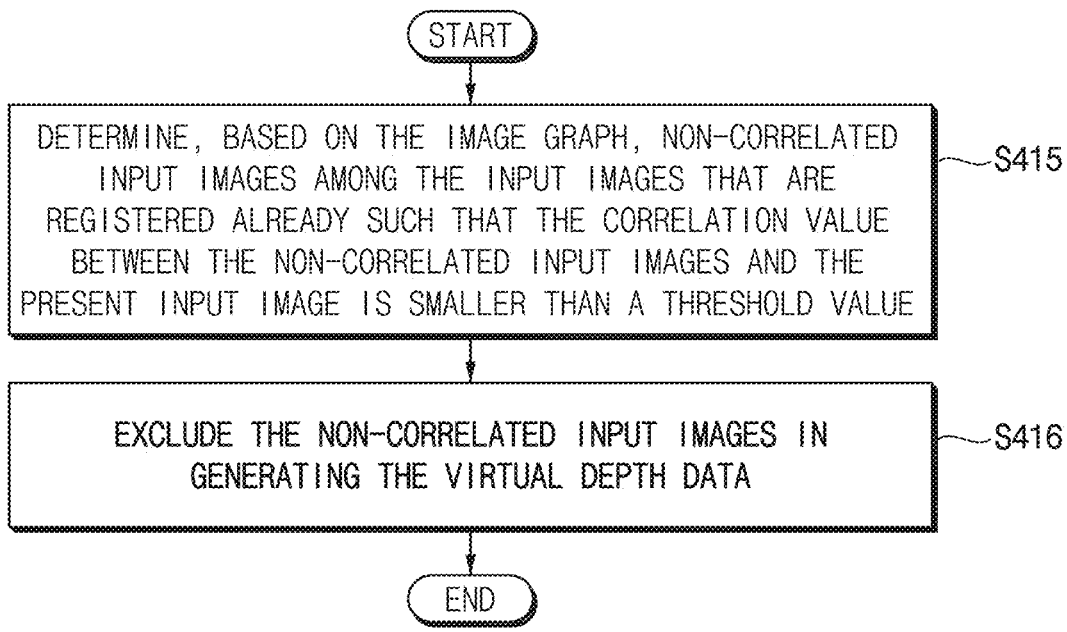

FIGS. 17 and 18 are flowcharts illustrating an example embodiment of generating pose information of a present input image in a method of generating a three-dimensional model according to some example embodiments.

Referring to FIGS. 2 and 17, the pose estimator 40 may determining, based on the image graph, a most-correlated input image among the input images that are registered already such that the correlation value between the most-correlated input image and the present input image is greatest among the input images that are registered already (S421). The pose estimator 40 may determine initial pose information of the present input image based on the depth data of the most-correlated input image and the depth data of the present input image (S422).

In the example of FIG. 13, the fifth, sixth and eighth input images $I_5$, $I_6$ and $I_8$ correspond to the registered input images that are registered already, and the seventh input image $I_7$ corresponds to the present input image that is registered by generating the pose information PILAF. In this case, the correlation values between the present input image $I_7$ and the registered input images $I_5$, $I_6$ and $I_8$ are M7,5=160, M7,6=83, M7,8=121, and thus the pose estimator 40 may determine the fifth input image $I_5$ as the most-correlated input image. In some example embodiments, the initial pose information PILAF of the present input image $I_7$ may be generated by performing the ICP algorithm based on the depth data of the present input image $I_7$ and the depth data of the most-correlated input image $I_5$. In some example embodiments, the initial pose information PINF of the present input image $I_7$ may be generated by performing the perspective-n-points (PnP) algorithm based on the depth data of the present input image $I_7$ and the depth data of the most-correlated input image $I_5$.

The pose estimator 40 may correct the initial pose information based on the virtual depth data and the depth data of the present input image to generate the pose information of the present input image (S423). In some example embodiments, the pose estimator 40 may correct the initial pose information by performing the ICP algorithm based on the virtual depth data, the depth data of the present input image and the initial pose information of the present input image.

As such, by determining the initial pose information using the registered input image that is most correlated with the present input image, the probability of converging the fault pose information by the ICP algorithm may be reduced and the accuracy of the pose estimation may be enhanced.

Referring to FIGS. 2 and 18, the pose estimator 40 may determine, based on the image graph, non-correlated input images among the input images that are registered already such that the correlation value between the non-correlated input images and the present input image is smaller than a threshold value (S415) and exclude the non-correlated input images in generating the virtual depth data (S416). Here, excluding the non-correlated input images may indicate that the depth values per pixel of the non-correlated input images are excluded in the calculation of Expression 1. The accuracy of the initial pose information may be enhanced by excluding the registered input images that are relatively less correlated with the present input image.

Figure 19:
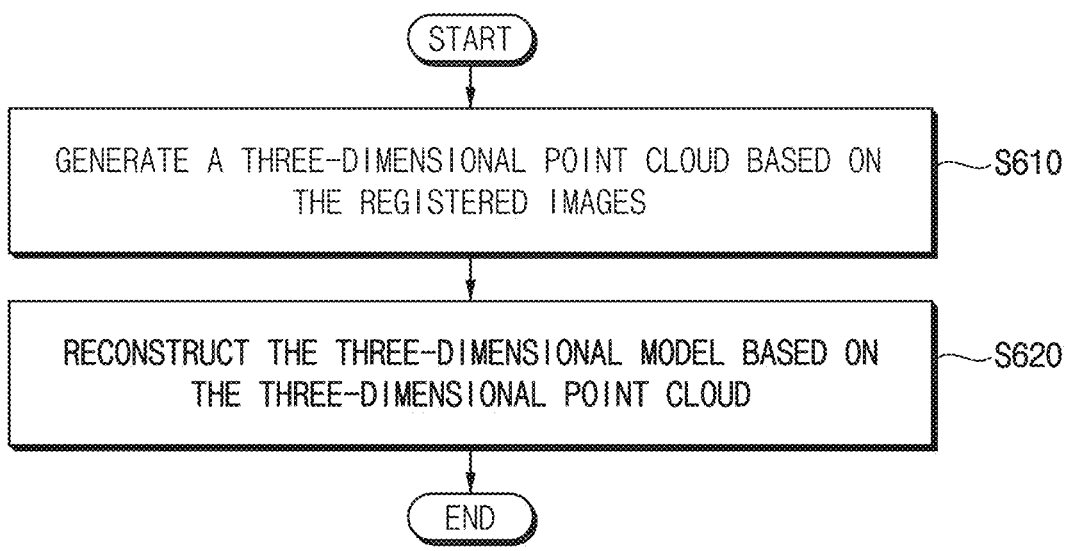
FIG. 19 is a flow chart illustrating an example embodiment of reconstructing a three-dimensional model in a method of generating a three-dimensional model according to some example embodiments.

FIG. 19 is a flow chart illustrating an example embodiment of reconstructing a three-dimensional model in a method of generating a three-dimensional model according to some example embodiments.

Referring to FIGS. 2 and 19, the model generator 60 may generate a three-dimensional point cloud based on the registered images (S610), and reconstruct the three-dimensional model corresponding to the target based on the three-dimensional point cloud (S620).

In some example embodiments, the three-dimensional point cloud may be optimized or improved by performing a three-dimensional bundle adjustment with respect to the registered images. The three-dimensional bundle adjustment may be performed by various methods known to those skilled in the art.

In some example embodiments, a surface of the three-dimensional model may be reconstructed using a truncated signed distance function (TSDF).

FIGS. 20A, 20B, 21 and 22 are diagrams illustrating effects of a method of generating a three-dimensional model according to some example embodiments.

Figure 20A:
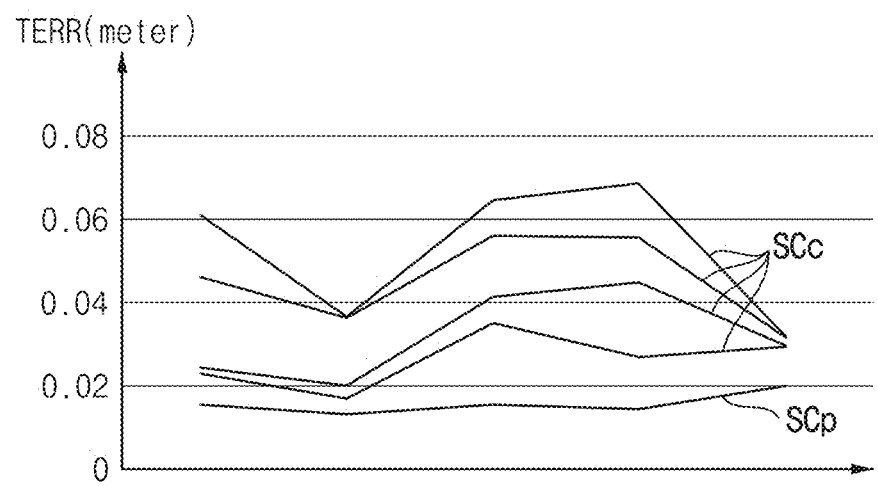
Figure 20B:
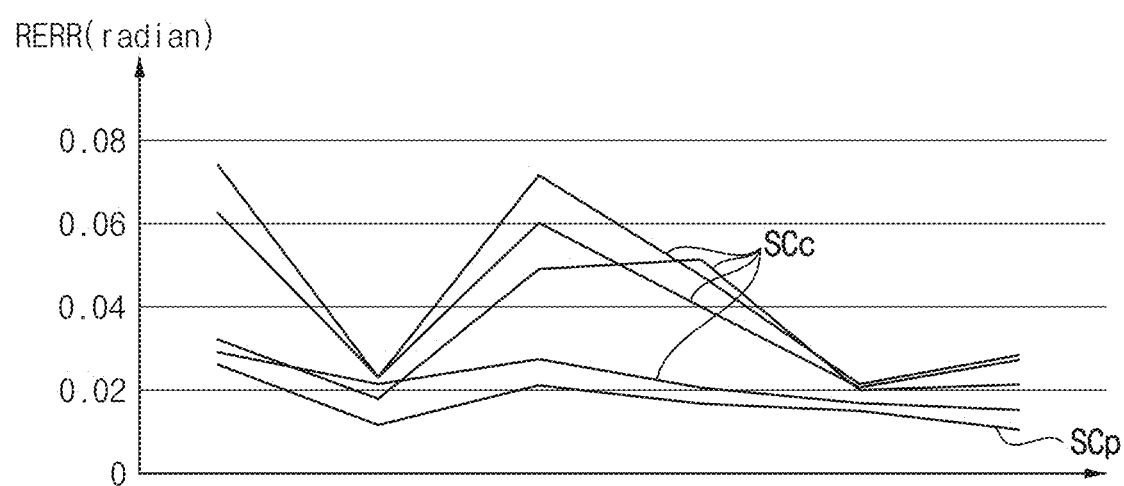

FIG. 20A illustrates translation error TERR in unit of meter of the pose information and FIG. 20B illustrates rotation error RERR in unit of radian of the pose information, which are estimated with respect to a plurality of image samples according to various methods. In FIGS. 20A and 20B, SCc indicates the result of the conventional methods, and SCp indicates the result of some example embodiments. FIG. 21 illustrates the detailed numerical results of the translation error Tran and the rotation error Rot with respect to several image samples ISET1~ISET5 according to the conventional methods SC1~SC3 and the method according to some example embodiments. As illustrated in FIGS. 20A, 20B and 20C, the method according to some example embodiments may provide the more regular result and the reduced error regardless of the kind of images, in comparison with the conventional methods.

Figure 22:
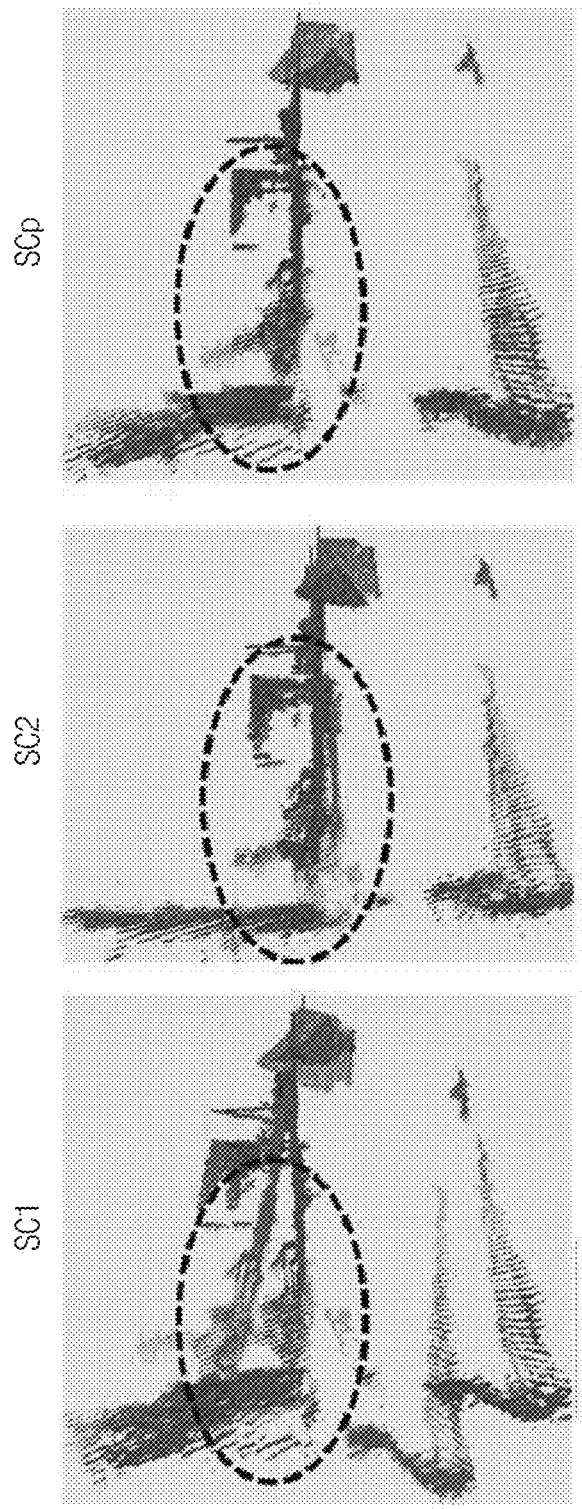

FIG. 22 illustrates the overlapped view of the two adjacent images. As illustrated in FIG. 22, in comparison with the conventional methods SC1 and SC2, the degree of overlapping and the accuracy of the pose information may be enhanced by the method SCp according to some example embodiments.

Figure 23:
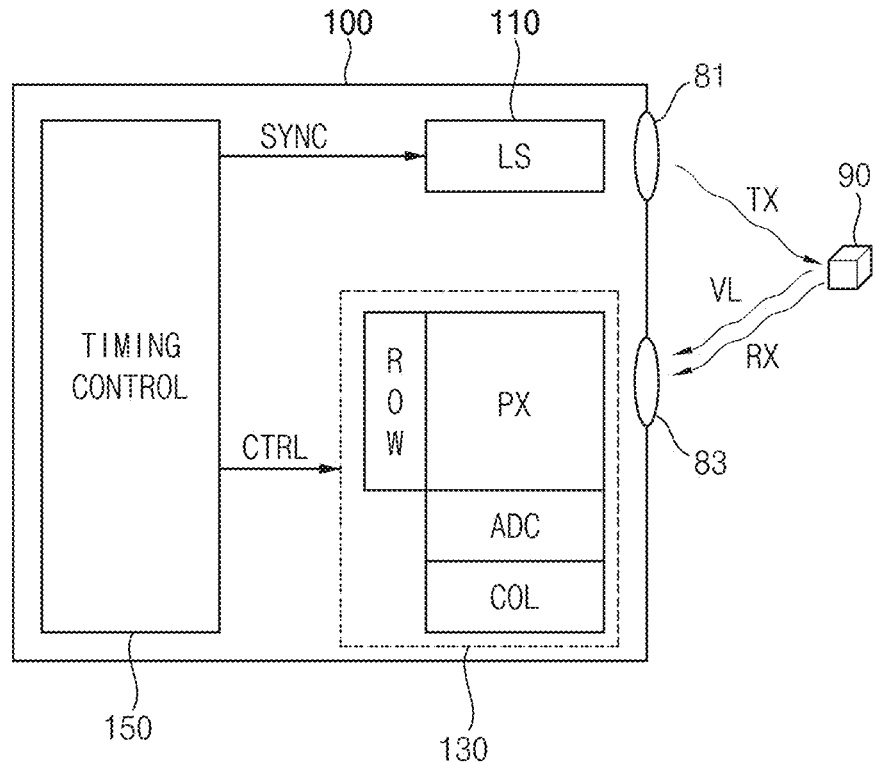
FIG. 23 is a block diagram illustrating an example of an image capturing device included in a system g device according to some example embodiments.

FIG. 23 is a block diagram illustrating an example of an image capturing device included in a system g device according to some example embodiments.

Referring to FIG. 23, the image capturing device 100 may include a light source (LS) 110, a sensing unit 130 and a timing control unit 150 (or timing controller). The light source 110 generates a modulated transmission light TX to illuminate an object with the modulated transmission light TX. The timing control unit 150 generates control signals SYNC and CTRL to control operations of the light source 110 and the sensing unit 130. The sensing unit 130 may include depth pixels that convert reception light RX to electrical signals. In addition, the sensing unit 130 may include color pixels that convert visible light VL to electrical signals.

The light source 110 may emit the modulated transmission light TX having a given, desired or predetermined wavelength. For example, the light source 110 may emit infrared light or near-infrared light. The transmission light TX generated by the light source 110 may be focused on the object 90 by a lens 81. The reception light RX reflected by the object 90 may be focused on the sensing unit 130 by a lens 83.

The light source 110 may be controlled by the control signal SYNC to output the modulated transmission light TX such that the intensity of the modulated transmission light TX periodically changes. For example, the light source 110 may be implemented with a light emitting diode (LED), a laser diode, or the like.

The control signal SYNC from the timing control unit 150 may include a reset signal RS and a transfer control signal TG, as will be described with reference to FIGS. 28A through 28D, and demodulation signals TG1 through TG4 as will be described with reference to FIGS. 30 and 31. The control signal SYNC provided to the light source 110 may include a signal to synchronize the modulated transmission light TX and the demodulation signals TG1 through TG4.

The sensing unit 130 may include a pixel array PX in which depth pixels and/or color pixels are arranged. Also the sensing unit 130 may include an analog-to-digital converting unit ADC and selection circuits ROW and COL to select a particular pixel in the pixel array PX.

In some example embodiments, the image capturing device 100 may be a three-dimensional image sensor including the depth pixels for providing distance information and the color pixels for providing image information. In this case, the sensing unit 130 may include a pixel array PX_CZ in which a plurality of depth pixels and a plurality of color pixels are alternatively arranged as will be described with reference to FIG. 25.

In some example embodiments, the image capturing device 100 may include a depth sensor and a two-dimensional image sensor distinct from each other. In this case, the sensing unit 130 may include a pixel array PX_C in which a plurality of color pixels are arranged and a pixel array PX_Z in which a plurality of depth pixels are arranged as will be described with reference to FIGS. 27A and 27B.

In some example embodiments, the analog-to-digital converting unit ADC may perform column analog-to-digital conversion that converts analog signals in parallel using a plurality of analog-to-digital converters respectively coupled to a plurality of column lines, or may perform single analog-to-digital conversion that converts the analog signals in series using a single analog-to-digital converter.

In some example embodiments, the analog-to-digital converting unit ADC may include a correlated double sampling (CDS) unit for extracting an effective signal component (the valid voltage) based on the voltages sampled by the pixels.

In some example embodiments, the CDS unit may perform analog double sampling (ADS) that extracts the effective signal component based on an analog reset signal that represents a reset component and an analog data signal that represents a signal component.

In some example embodiments, the CDS unit may perform digital double sampling (DDS) that converts the analog reset signal and the analog data signal into two digital signals to extract as the effective signal component a difference between the two digital signals.

In some example embodiments, the CDS unit may perform dual correlated double sampling that performs both of analog double sampling and digital double sampling.

Figure 24:
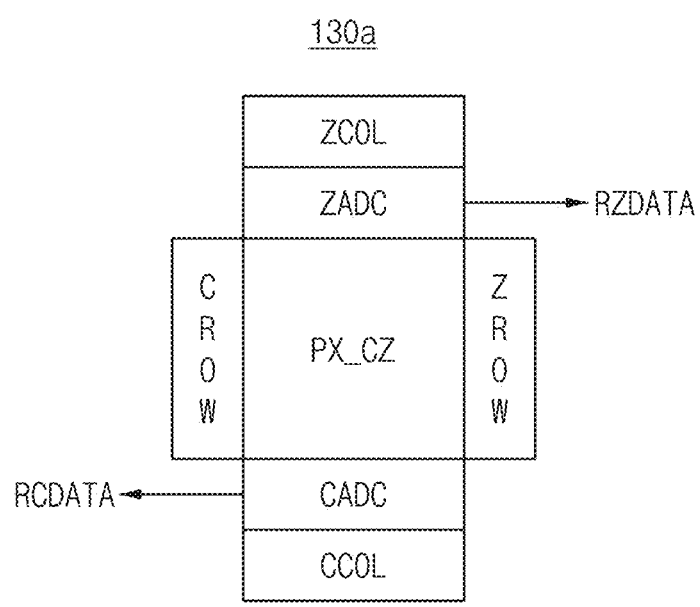
FIG. 24 is a diagram illustrating an example embodiment of a sensing unit included in the image capturing device of FIG. 23.

FIG. 24 is a diagram illustrating an example embodiment of a sensing unit included in the image capturing device of FIG. 23. FIG. 24 illustrates an example embodiment of a sensing unit 130a in a case where the image capturing device 100 of FIG. 23 is a three-dimensional image sensor.

Referring to FIG. 24, the sensing unit 130a may include a pixel array PX_CZ where a plurality of color pixels and a plurality of depth pixels are arranged, a color pixel select circuit CROW and CCOL, a depth pixel select circuit ZROW and ZCOL, a color pixel converter CADC and a depth pixel converter ZADC. The color pixel select circuit CROW and CCOL and the color pixel converter CADC may provide color information RCDATA by controlling the color pixels included in the pixel array PX_CZ, and the depth pixel select circuit ZROW and ZCOL and the depth pixel converter ZADC may provide depth information RZDATA by controlling the depth pixels included in the pixel array PX_CZ.

As such, in the three-dimensional image sensor as illustrated in FIG. 24, components for controlling the color pixels and components for controlling the depth pixels may independently operate to provide the color information RCDATA and the depth information RZDATA of the captured image.

Figure 25:
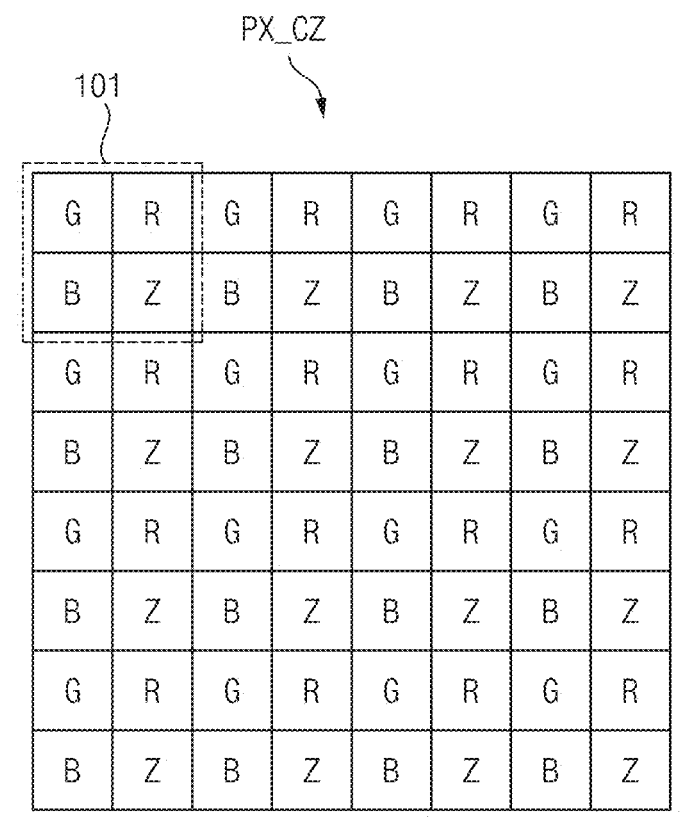

FIG. 25 is a diagram illustrating an example embodiment of a pixel array included in the sensing unit of FIG. 24.

Referring to FIG. 25, the pixel array PX_CZ may include the color pixels R, G and B for providing the image information and the depth pixels Z for providing the depth information. For example, the pixel pattern 101 including the red pixel R, the green pixel G, the blue pixel B and the depth pixel Z may be repeatedly arranged in the pixel array PX_CZ.

Each of (or alternatively, at least one of) the color pixels R, G and B may include a photo-detection region for collecting photo-electrons generated by the incident visible light, and the depth pixel Z may include a photo-detection region for collecting photo-electrons generated by the reception light RX, that is, the incident infrared light or near-infrared light. For example, to enhance quantum efficiency, the depth pixel Z may include a photodiode formed deeper than that of the color pixels R, G and B since the infrared light has a longer wavelength than that of the visible light.

Color filters may be formed over the color pixels R, G and B and infrared light pass filters may be formed over the depth pixels Z. For example, the red pixel R may be defined by the red filter, the green pixel G may be defined by the green filter, the blue pixel B may be defined by the blue filter and the depth pixel Z may be defined by the infrared light pass filter. In addition, infrared light cut filters may be further formed over the color pixels R, G and B.

FIG. 25 illustrates a non-limiting example of the pixel pattern 101, and the pixel pattern 101 may be changed variously. For example, the area ratio of the one color pixel and the one depth pixel may be changed variously and/or the number ratio of the color pixels and the depth pixels in the pixel array PX_CZ may be changed variously.

Figure 26:
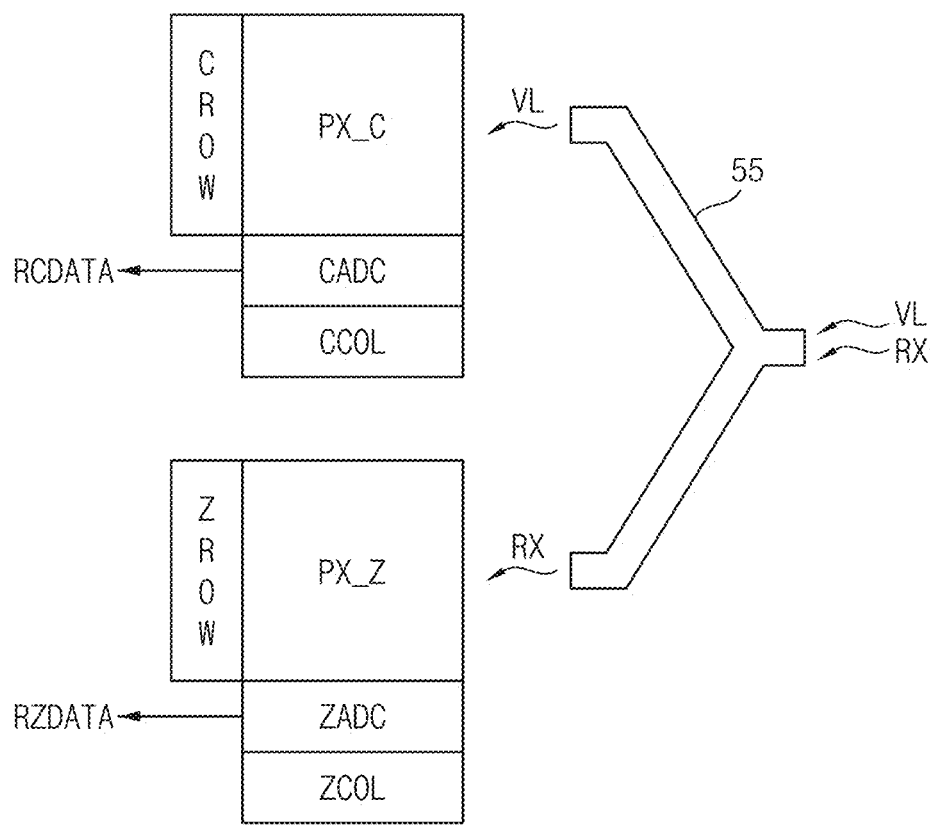
FIG. 26 is a diagram illustrating an example embodiment of a sensing unit included in the image capturing device of FIG. 23.

FIG. 26 is a diagram illustrating an example embodiment of a sensing unit included in the image capturing device of FIG. 23. FIG. 26 illustrates an example embodiment of a sensing unit 130b in a case where the image capturing device 100 of FIG. 23 includes a depth sensor and a two-dimensional image sensor distinct from each other.

Referring to FIG. 26, the sensing unit 130b may include a pixel array PX_C where a plurality of color pixels are arranged and a pixel array PX_Z where a plurality of depth pixels are arranged. The visible light VL for the color information and the reception light RX for the depth information may be separated by a beam splitter 55 and then illuminated to the respective pixel arrays PX_C and PX_Z.

A color pixel select circuit CROW and CCOL, a depth pixel select circuit ZROW and ZCOL, a color pixel converter CADC and a depth pixel converter ZADC may be disposed adjacent to the respective pixel arrays PX_C and PX_Z. The color pixel select circuit CROW and CCOL and the color pixel converter CADC may provide the color information RCDATA by controlling the color pixels included in the pixel array PX_C, and the depth pixel select circuit ZROW and ZCOL and the depth pixel converter ZADC may provide the depth information RZDATA by controlling the depth pixels included in the pixel array PX_Z.

As such, the sensing unit 130b may include the depth sensor and the two-dimensional image sensor distinct from each other such that the components for controlling the color pixels and the components for controlling the depth pixels may be implemented to respectively provide the color information RCDATA and the depth information RZDATA.

Figures 27A, 27B:
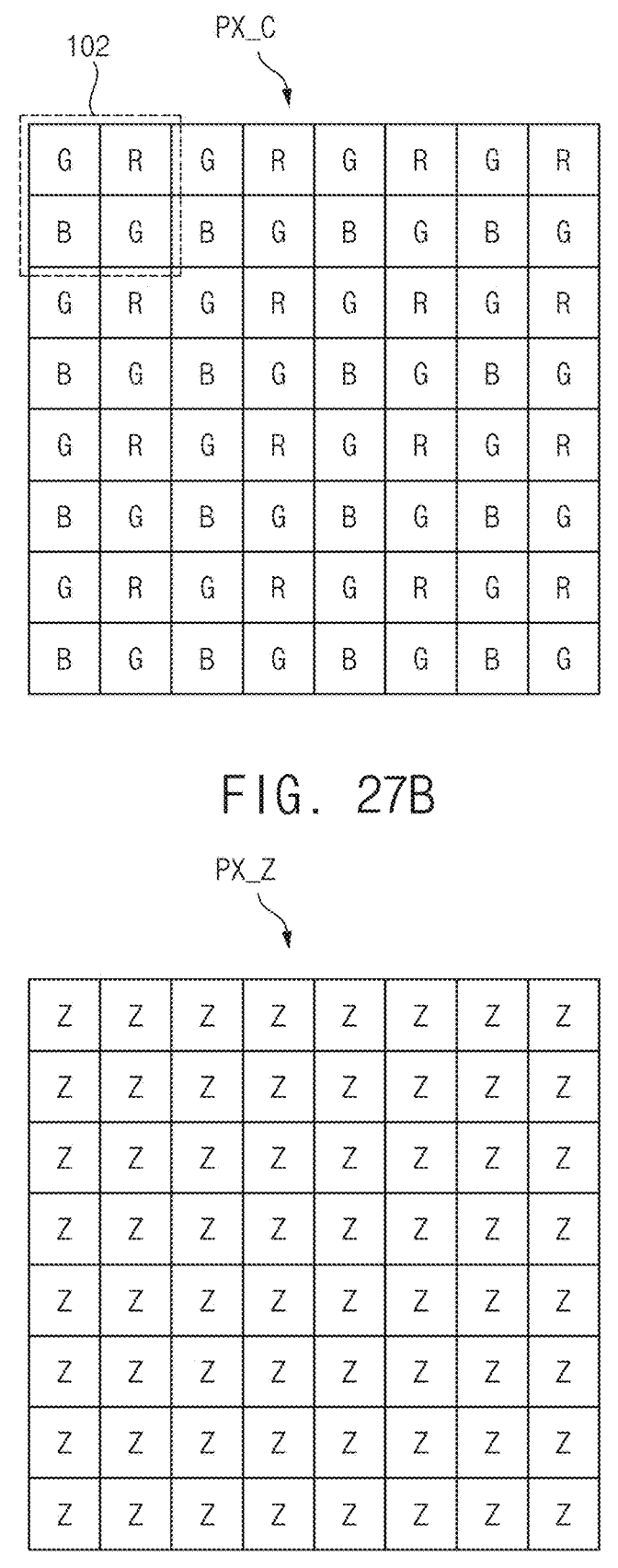

FIGS. 27A and 27B are diagrams illustrating some example embodiments of a pixel array included in the sensing unit of FIG. 26.

Referring to FIG. 27A, a first pixel array PX_C includes the color pixels R, G and B for providing the image information. For example, a pixel pattern 102 including the green pixel G, the red pixel R, the blue pixel B and the green pixel G may be repeatedly arranged in the first pixel array PX_C. Each of (or alternatively, at least one of) the color pixels R, G and B may include a photo-detection region for collecting photo-electrons generated by the incident visible light. Color filters may be formed over the color pixels R, G and B. For example, the red pixel R may be defined by the red filter, the green pixel G may be defined by the green filter, and/or the blue pixel B may be defined by the blue filter.

Referring to FIG. 27B, a second pixel array PX_Z includes the depth pixels Z for providing the depth information. For example, the identical depth pixels Z may be repeatedly arranged in the second pixel array PX_Z. Each of (or alternatively, at least one of) the depth pixels Z may include a photo-detection region for collecting photo-electrons generated by the reception light RX, that is, the incident infrared light or near-infrared light. The infrared light pass filter may be formed over each depth pixel Z.

FIGS. 28A, 28B, 28C and 28D are circuit diagrams illustrating some example embodiments of a unit pixel included in a pixel array.

The unit pixels 200a, 200b, 200c, and 200d illustrated in FIGS. 28A, 28B, 28C and 28D may be a color pixel including a color photodiode or a depth pixel including a depth photodiode.

Figure 28A:
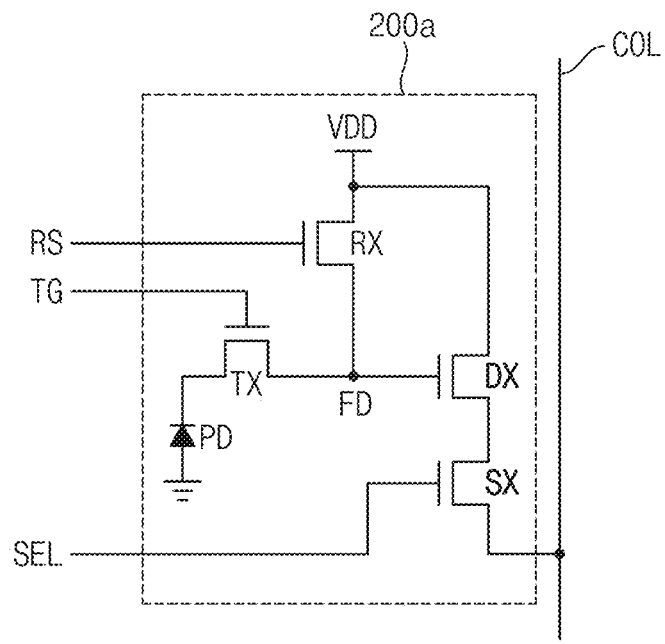
FIGS. 28A, 28B, 28C and 28D are circuit diagrams illustrating some example embodiments of a unit pixel included in a pixel array.

Referring to FIG. 28A, the unit pixel 200a may include a photo-sensitive element such as a photodiode PD, and a readout circuit including a transfer transistor TX, a reset transistor RX, a drive transistor DX and a selection transistor SX.

For example, the photodiode PD may include an n-type region in a p-type substrate such that the n-type region and the p-type substrate form a p-n conjunction diode. The photodiode PD receives the incident light and generates a photo-charge based on the incident light. In some example embodiments, the unit pixel 200a may include a photo transistor, a photo gate, a pinned photo diode, etc. instead of or in addition to the photodiode PD.

The photo-charge generated in the photodiode PD may be transferred to a floating diffusion node FD through the transfer transistor TX, which is turned on in response to a transfer control signal TG. The drive transistor DX functions as a source follower amplifier that amplifies a signal corresponding to the charge on the floating diffusion node FD. The selection transistor SX may transfer the amplified signal to a column line COL in response to a selection signal SEL. The floating diffusion node FD may be reset by the reset transistor RX. For example, the reset transistor RX may discharge the floating diffusion node FD in response to a reset signal RS for correlated double sampling (CDS).

Figure 28B:
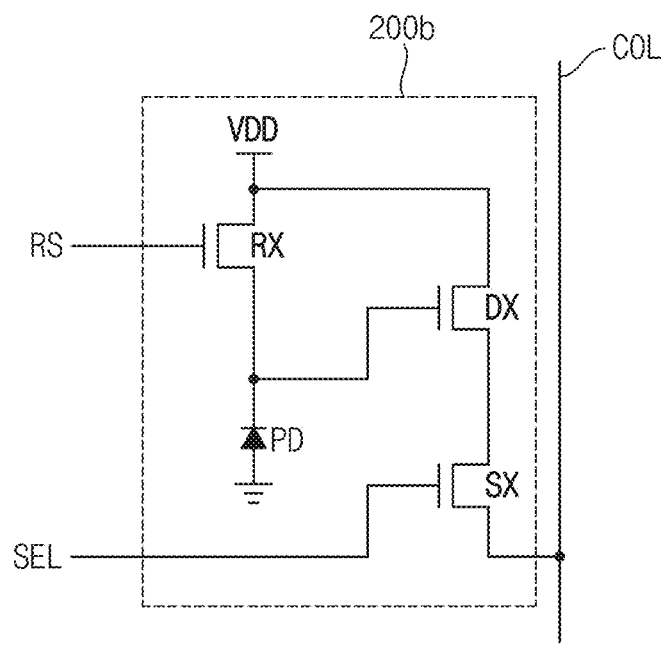
Figure 28C:
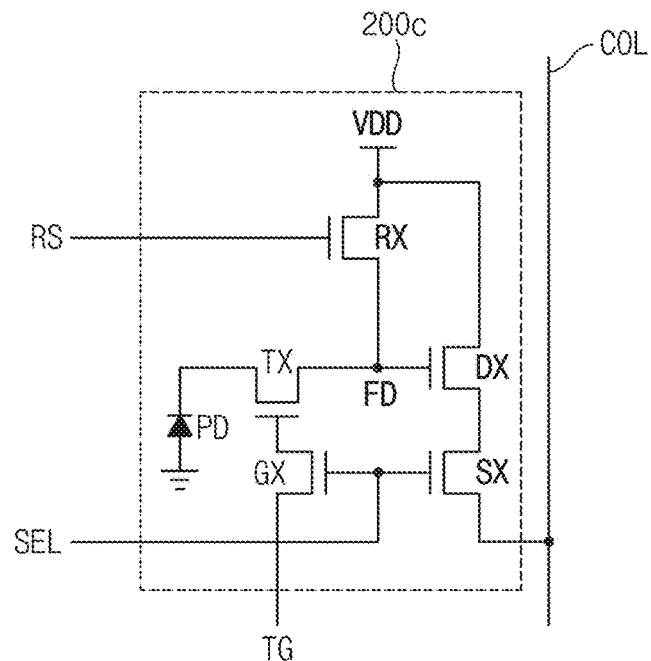
Figure 28D:
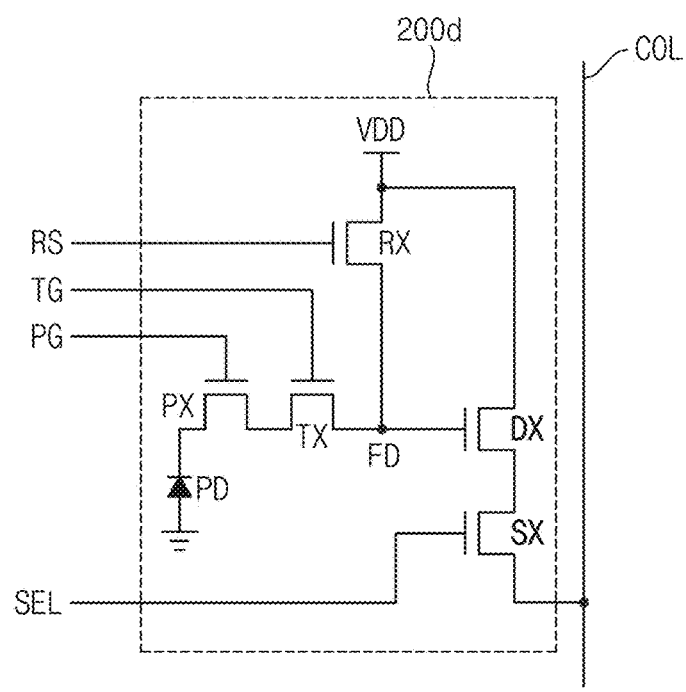

FIG. 28A illustrates the unit pixel 200a of the four-transistor configuration including the four transistors TX, RX, DX and SX. The configuration of the unit pixel may be variously changed as illustrated in FIGS. 28B, 28C and 28D. Power is supplied via voltage supply terminal VDD and ground.

Referring to FIG. 28B, the unit pixel 200b may have the three-transistor configuration including a photo-sensitive element such as a photodiode PD, and a readout circuit including a reset transistor RX, a drive transistor DX and a selection transistor SX. Compared with the unit pixel 200a of FIG. 28A, the transfer transistor TX is omitted in the unit pixel 200b of FIG. 28B.

Referring to FIG. 28C, the unit pixel 200c may have the five-transistor configuration including a photo-sensitive element such as a photodiode PD, and a readout circuit including a transfer transistor TX, a gate transistor GX, a reset transistor RX, a drive transistor DX and a selection transistor SX. The gate transistor GX may selectively apply the transfer control signal TG to the transfer transistor TX in response to the selection signal SEL. Compared with the unit pixel 200a of FIG. 28A, the gate transistor GX is further included in the unit pixel 200c of FIG. 28C.

Referring to FIG. 28D, the unit pixel 200d may have the five-transistor configuration including a photo-sensitive element such as a photodiode PD, and a readout circuit including a photo transistor PX, a transfer transistor TX, a reset transistor RX, a drive transistor DX and a selection transistor SX. The photo transistor PX may be turned on or off in response to a photo gate signal PG. The unit pixel 200d may enabled when the photo transistor PX is turned on and disabled when the photo transistor PX is turned off. Compared with the unit pixel 200a of FIG. 28A, the photo transistor PX is further included in the unit pixel 200d of FIG. 28D. In addition, the unit pixel may have six-transistor configuration further including the gate transistor GX of FIG. 28C (or a bias transistor) in addition to the configuration of FIG. 28D.

Figure 29:
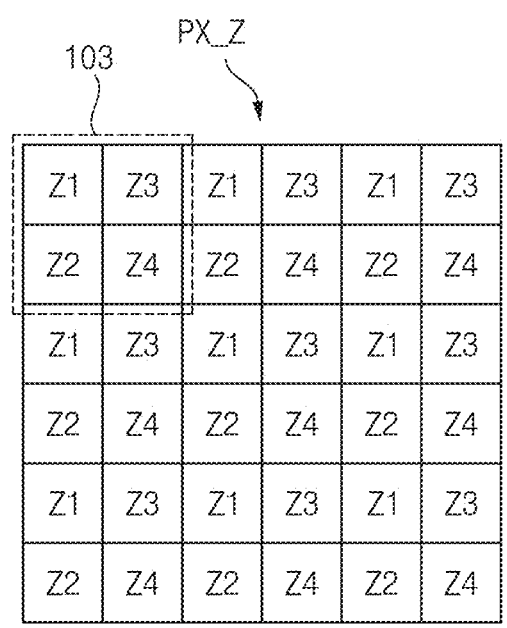
FIG. 29 is a diagram illustrating an example embodiment of a pixel array included in a depth sensor.

FIG. 29 is a diagram illustrating an example embodiment of a pixel array included in a depth sensor.

Referring to FIG. 29, the pixel array PX_Z includes a plurality of depth pixels Z1, Z2, Z3 and Z4. The depth pixels Z1, Z2, Z3 and Z4 may be the time-of-flight (TOF) depth pixels that operate in response to a plurality of demodulation signals having different phases from each other. For example, the depth pixel Z1 may operate in response to the demodulation signal having phase difference of 0 degrees with respect to the transmission light TX radiated from the image capturing device 100 of FIG. 4. In other words, the depth pixel Z1 may operate in response to the demodulation signal having the same phase with the transmission light TX. The depth pixel Z2 may operate in response to the demodulation signal having phase difference of 90 degrees with respect to the transmission light TX, the depth pixel Z3 may operate in response to the demodulation signal having phase difference of 180 degrees with respect to the transmission light TX, and the depth pixel Z4 may operate in response to the demodulation signal having phase difference of 270 degrees with respect to the transmission light TX. For example, the pixel pattern 103 including the depth pixels Z1, Z2, Z3 and Z4, which operate respectively in response to the demodulation signals of the different phases, may be repeatedly arranged in the pixel array PX_Z.

Figure 30:
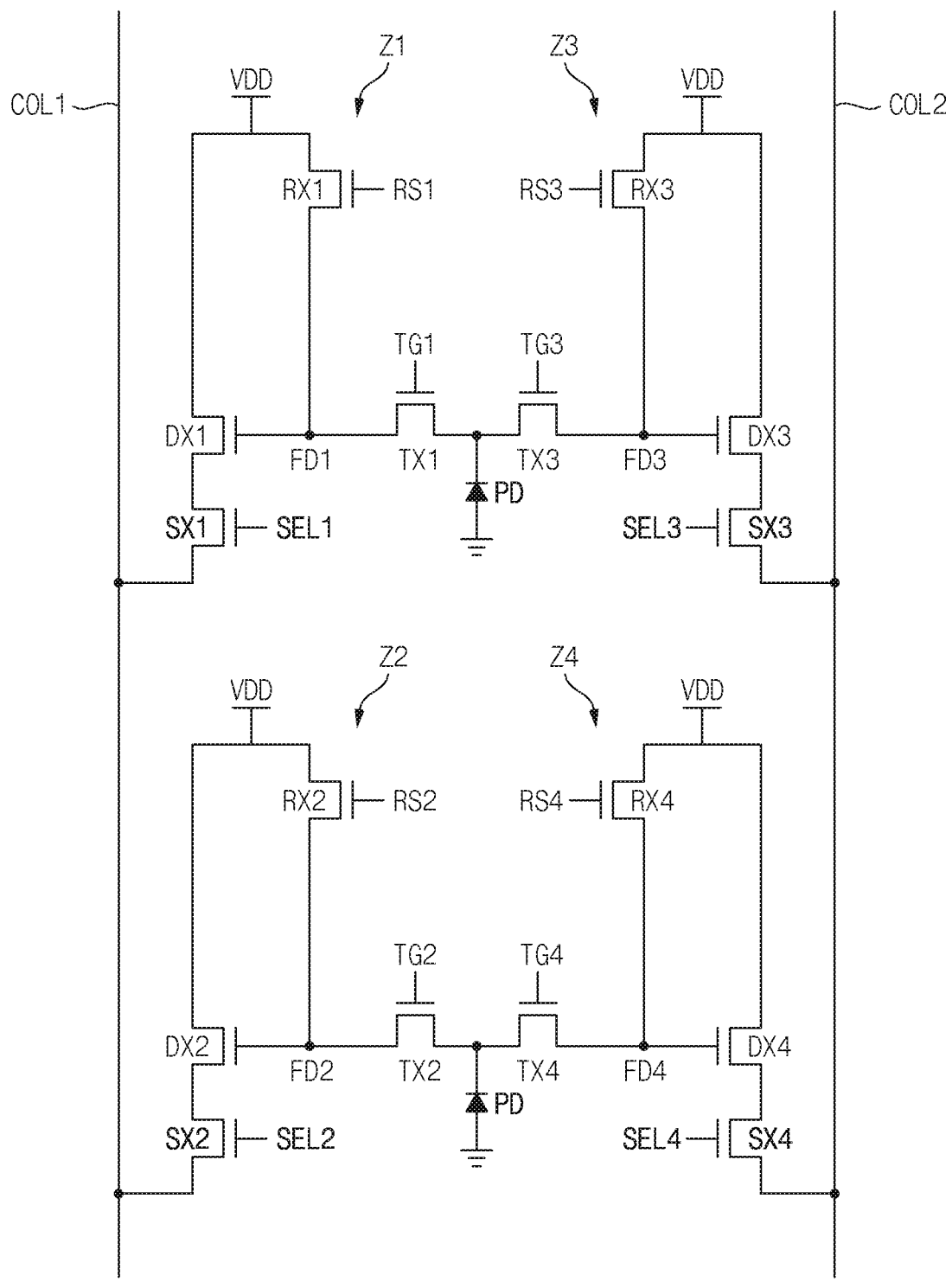
FIG. 30 is a circuit diagram illustrating an example embodiment of a depth pixel included in the pixel array of FIG. 29.

FIG. 30 is a circuit diagram illustrating an example embodiment of a depth pixel included in the pixel array of FIG. 29. FIG. 30 illustrates the one pixel pattern 103 in the pixel array PX_Z in FIG. 29.

Compared with the unit pixels of a single-tap structure in FIGS. 28A, 28B, 28C and 28D, first through fourth pixels Z1, Z2, Z3 and Z4 in FIG. 30 have a two-tap structure for measuring the distance according to the TOF scheme.

Referring to FIG. 30, the first and third pixels Z1 and Z3 may share a photo-sensitive element such as a photodiode PD. The first pixel Z1 may include a first readout circuit including a first transfer transistor TX1, a first reset transistor RX1, a first drive transistor DX1 and a first selection transistor SX1. The third pixel Z3 may include a third readout circuit including a third transfer transistor TX3, a third reset transistor RX3 and a third selection transistor SX3. In the same way, the second and fourth pixels Z2 and Z4 may share a photo-sensitive element such as a photodiode PD. The second pixel Z2 may include a second readout circuit including a second transfer transistor TX2, a second reset transistor RX2, a second drive transistor DX2 and a second selection transistor SX2. The fourth pixel Z4 may include a fourth readout circuit including a fourth transfer transistor TX4, a fourth reset transistor RX4, a fourth drive transistor DX4 and a fourth selection transistor SX4.

For example, the photodiode PD may include an n-type region in a p-type substrate such that the n-type region and the p-type substrate form a p-n conjunction diode. The photodiode PD receives the incident light and generates a photo-charge based on the incident light. In some example embodiments, the unit pixel 200e illustrated in FIG. 30 may include a photo transistor, a photo gate, a pinned photo diode, etc. instead of or in addition to the photodiode PD.

The photo-charge generated in the photodiodes PD may be transferred to floating diffusion nodes FD1, FD2, FD3 and FD4 through the transfer transistors TX1, TX2, TX3 and TX4, respectively. The transfer control signals TG1, TG2, TG3 and TG4 may be the above-described demodulation signals having the phase difference of 0, 90, 180 and 270 degrees, respectively, with respect to the transmission light TX. As such, the photo charge generated in the photodiodes PD may be divided in response to the demodulation signals TG1, TG2, TG3 and TG4 to determine the roundtrip TOF of the light and the distance to the object may be calculated based on the roundtrip TOF.

The drive transistors DX1, DX2, DX3 and DX4 function as source follower amplifiers that amplify signals corresponding to the respective charges on the floating diffusion nodes FD1, FD2, FD3 and FD4. The selection transistors SX1, SX2, SX3 and SX4 may transfer the amplified signals to the column lines COL1 and COL2 in response to the selection signals SEL1, SEL2, SEL3 and SEL4, respectively. The floating diffusion nodes FD1, FD2, FD3 and FD4 may be reset by the reset transistors RX1, RX2, RX3 and RX4, respectively. For example, the reset transistors RX1, RX2, RX3 and RX4 may discharge the floating diffusion nodes FD1, FD2, FD3 and FD4 in response to reset signals RS1, RS2, RS3 and RS4, respectively, for correlated double sampling (CDS).

FIG. 30 illustrates the non-limiting example of the depth pixels of the two-tap configuration, and the depth pixels may have various configurations such as a single-tap configuration, four-tap configuration, etc. The timing of the control signals may be determined properly depending on the configuration of the depth pixels.

Figure 31:
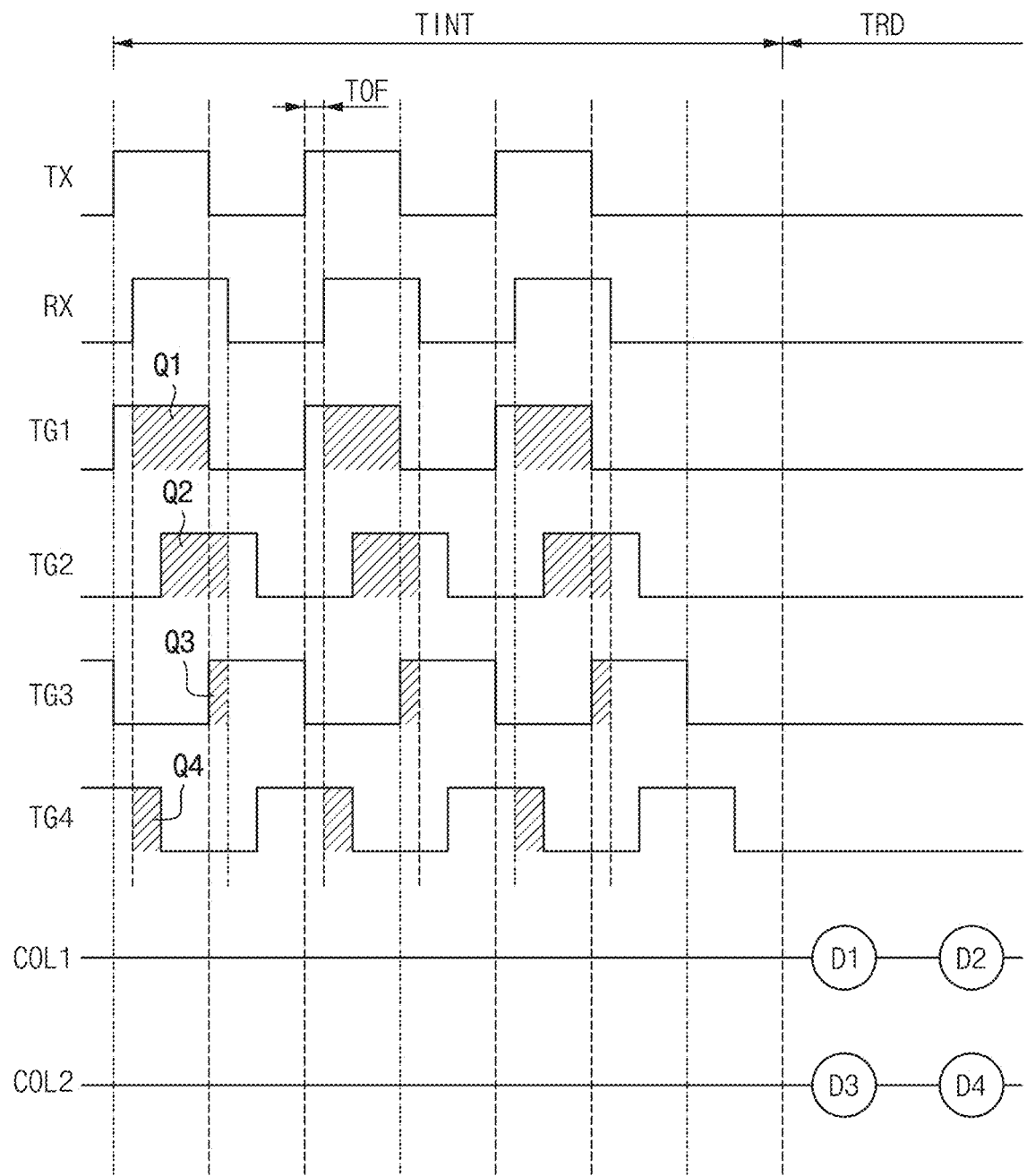
FIG. 31 is a timing diagram illustrating a time of flight (ToF) operation of the depth pixel of FIG. 30.

FIG. 31 is a timing diagram illustrating a time of flight (ToF) operation of the depth pixel of FIG. 30.

Referring to FIG. 31, an object is illuminated with a modulated transmission light TX during an integration time interval TINT. As described with reference to FIG. 23, the image capturing device 100 may include a light source 110 or a light-emitting device to generate the modulated transmission light TX having periodically varying intensity. For example, the image capturing device 100 may repeat the transmission and non-transmission of the modulated transmission light TX by turning on or off the light-emitting device at a frequency ranging from about 10 MHz to about 200 MHz. Even though FIG. 31 illustrates the modulated transmission light TX of a pulse train, an arbitrary periodic light signal such as a sinusoidal signal may be used as the modulated transmission light TX and the demodulation signals TG1, TG2, TG3 and TG4.

The modulated transmission light TX is reflected by the object and returned to the image capturing device 100 as a reception light RX. The reception light RX is delayed by a time-of-flight (TOF) with respect to the modulated transmission light TX. The photo-charge is generated in the photo-detection region of the depth pixel by the reception light RX.

The demodulation signals TG1, TG2, TG3 and TG4 may have a given, desired or predetermined phases with respect to the modulated transmission light TX. If the photo-charges Q1, Q2, Q3 and Q4 integrated during the activation interval of the demodulation signals TG1, TG2, TG3 and TG4 are obtained, the TOF may be calculated based on the photo-charges Q1, Q2, Q3 and Q4.

When the distance from the photo-sensing device to the object is 'D' and a light velocity is 'c', the distance may be calculated using the relation D=(TOF*c)/2. Even though FIG. 31 illustrates the four demodulation signals TG1, TG2, TG3 and TG4 having the different phases, a different combination of the demodulation signals may be used to obtain the TOF. For example, the image capturing device 100 may use only the first demodulation signal TG1 having a phase equal to a phase of the modulated transmission light TX and a third demodulation signal TG3 having a phase opposite to the phase of the modulated transmission light TX. Even though not illustrated in FIG. 31, the photo-detection regions PD and the floating diffusion regions FD may be initialized by activating the reset signal RS, etc. before the integration time interval TINT.

During a readout time interval TRD, the data bits D1, D2, D3 and D4 corresponding to the integrated photo-charges Q1, Q2, Q3 and Q4 are provided through column lines COL1 and COL2.

Figure 32:
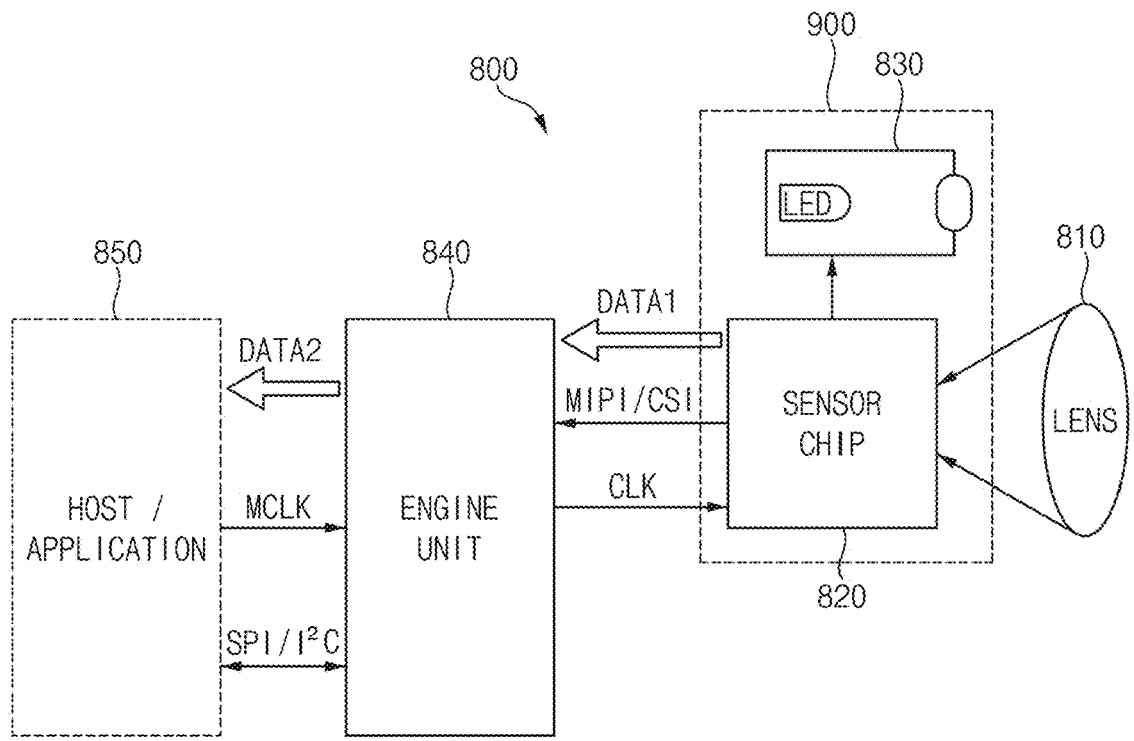
FIG. 32 is a block diagram illustrating a camera system according to some example embodiments.

FIG. 32 is a block diagram illustrating a camera system according to some example embodiments.

Referring to FIG. 32, a camera 800 includes a photo-receiving lens 810, a three-dimensional image sensor 900 and an engine unit 840. The three-dimensional image sensor 900 may include a three-dimensional image sensor chip 820 and a light source module 830. According to some example embodiments, the three-dimensional image sensor chip 820 and the light source module 830 may be implemented with separated devices, or at least a portion of the light source module 830 may be included in the three-dimensional image sensor chip 820. In some example embodiments, the photo-receiving lens 810 may be included in the three-dimensional image sensor chip 820.

The photo-receiving lens 810 may focus incident light on a photo-receiving region (e.g., depth pixels and/or color pixels included in a pixel array) of the three-dimensional image sensor chip 820. The three-dimensional image sensor chip 820 may generate data DATA1 including depth information and/or color image information based on the incident light passing through the photo-receiving lens 810. For example, the data DATA1 generated by the three-dimensional image sensor chip 820 may include depth data generated using infrared light or near-infrared light emitted from the light source module 830 and red, green, blue (RGB) data of a Bayer pattern generated using external visible light. The three-dimensional image sensor chip 820 may provide the data DATA1 to the engine unit 840 based on a clock signal CLK. In some example embodiments, the three-dimensional image sensor chip 820 may interface with the engine unit 840 via mobile industry processor interface (MIPI®) and/or camera serial interface (CSI).

The engine unit 840 controls the three-dimensional image sensor 900. The engine unit 840 may process the data DATA1 received from the three-dimensional image sensor chip 820. To perform the above-described method of recognizing the motion according to some example embodiments, the engine unit 840 may include motion region tracker 300 and/or the motion analyzer 500. The engine unit may perform data processing in addition to the motion recognition. For example, the engine unit 840 may generate three-dimensional color data based on the data DATA1 received from the three-dimensional image sensor chip 820. In other examples, the engine unit 840 may generate luminance, chrominance (YUV) data including a luminance component Y, a blue-luminance difference component U, and a red-luminance difference component V based on the RGB data included in the data DATA1, or compressed data, such as Joint Photographic Experts Group (JPEG) data. The engine unit 840 may be connected to a host/application 850 and may provide data DATA2 to the host/application 850 based on a master clock MCLK. Further, the engine unit 840 may interface with the host/application 850 via serial peripheral interface (SPI) and/or inter integrated circuit (I2C).

Figure 33:
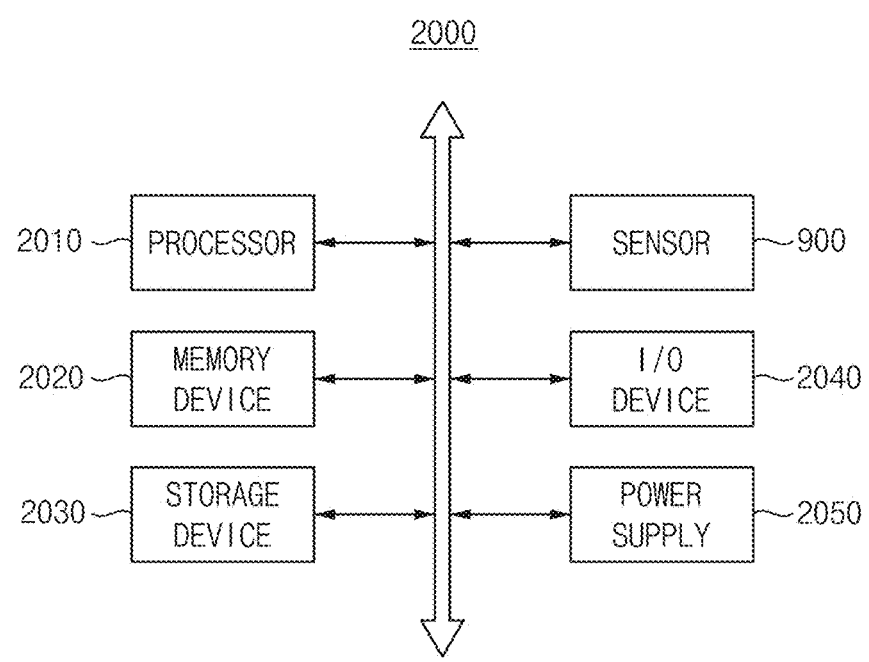
FIG. 33 is a block diagram illustrating a computer system according to some example embodiments.

FIG. 33 is a block diagram illustrating a computer system according to some example embodiments.

Referring to FIG. 33, a computing system 2000 may include a processor 2010, a memory device 2020, a storage device 2030, an input/output device 2040, a power supply 2050 and a three-dimensional image sensor 900. Although it is not illustrated in FIG. 33, the computing system 2000 may further include ports that communicate with a video card, a sound card, a memory card, a universal serial bus (USB) device, and/or other electronic devices.

The processor 2010 may perform various calculations or tasks. According to some example embodiments, the processor 2010 may be a microprocessor or a central processing unit (CPU). The processor 2010 may communicate with the memory device 2020, the storage device 2030 and the input/output device 2040 via an address bus, a control bus, and/or a data bus. In some example embodiments, the processor 2010 may be coupled to an extended bus, such as a peripheral component interconnection (PCI) bus. The memory device 2020 may store data for operating the computing system 2000. For example, the memory device 2020 may be implemented with a dynamic random access memory (DRAM) device, a mobile DRAM device, a static random access memory (SRAM) device, a phase random access memory (PRAM) device, a ferroelectric random access memory (FRAM) device, a resistive random access memory (RRAM) device, and/or a magnetic random access memory (MRAM) device. The storage device 2030 may include a solid state drive (SSD), a hard disk drive (HDD), a compact-disc read-only memory (CD-ROM), etc. The input/output device 2040 may include an input device (e.g., a keyboard, a keypad, a mouse, etc.) and an output device (e.g., a printer, 3D printer, a display device, etc.). The power supply 2050 supplies operation voltages for the computing system 1000.

The three-dimensional image sensor 900 may communicate with the processor 2010 via the buses or other communication links. The three-dimensional image sensor 900 may be integrated with the processor 2010 in one chip, or the three-dimensional image sensor 900 and the processor 2010 may be implemented as separate chips.

The computing system 2000 may be any computing system using a three-dimensional image sensor. For example, the computing system 1000 may include a digital camera, a mobile phone, a smart phone, a portable multimedia player (PMP), a personal digital assistant (PDA), etc.

As described above, the method and data processing device according to some example embodiments may generate the exact or near exact pose information and reconstruct the elaborate three-dimensional model by determining the registration order based on the color data and sequentially generating the pose information of the input images according to the registration order using the registered images. In addition, the method and the data processing device according to some example embodiments may estimate the exact or near exact pose information with respect to both cases of large motion and small motion by using both of the color data and the depth data. Further, the method and data processing device according to some example embodiments may supplement deficient images and remove the noisy images conveniently by determining the registration order based on the image graph representing the correlation degrees between the input images. The reconstructed three-dimensional model may be displayed on the display device of the input/output device 2040 or the display device 1112. The three-dimensional model may also be printed by the 3D printer of the input/output device 2040, or a two-dimensional rendering of the three-dimensional model may be printed by the printer of the input/output device 2040. The three-dimensional model may be utilized in a variety of ways such as inserting the three-dimensional model into a video game or virtual or augmented reality environment. The three-dimensional model may also be used for creating instructions to generate a mold for generating copies of the object being modeled. The mold may be created by using a computer operated machine to carve out the mold, or by 3D printing the mold.

Some example embodiments may be applied to any electronic devices and systems. For example, the inventive concepts may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a three-dimensional scanner, a three-dimensional printer, a motion tracking device, etc.

Any of the elements and/or functional blocks disclosed above may include or be implemented in processing circuitry such as hardware including logic circuits; a hardware/software combination such as a processor executing software; or a combination thereof. For example, the controller 10, timing control unit 150, image signal processor 1166, general purpose processor 1161, and processor 2010 may be implemented as processing circuitry. The processing circuitry specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

The foregoing is illustrative of some example embodiments and is not to be construed as limiting thereof Although a few example embodiments have been described, those skilled in the art will readily appreciate that many modifications are possible in the detailed example embodiments without materially departing from the present inventive concepts.

What is claimed is:

1. A method of generating a three-dimensional model, comprising:
    obtaining, by a data processing device, a plurality of input images such that each input image of the plurality of input images includes color data and depth data of a target;
    generating, by the data processing device, an image graph based on the color data of the plurality of input images such that the image graph includes correlation values between the plurality of input images;
    determining, by the data processing device, a registration order of the plurality of input images based on the image graph, the determining the registration order of the plurality of input images including determining, based on the correlation values between the plurality of input images, two input images to be registered first determining a present input image to be registered next based on correlation values between input images that are not registered yet and input images that are registered already;
    sequentially generating, by the data processing device, pose information of each input image of the plurality of input images based on the registration order and the depth data of the plurality of input images;
    sequentially registering, by the data processing device, the plurality of input images as registered input images such that each registered input image includes the pose information; and
    reconstructing, by the data processing device, the three-dimensional model of the target based on the registered input images.

2. The method of claim 1, wherein generating the image graph includes:
    extracting two-dimensional feature points included in each input image of the plurality of input images based on the color data of each input image of the plurality of input images;
    generating matching information indicating mapping relations of the two dimensional feature points included in different input images of the plurality of input images; and
    determining the correlation values the plurality of input images based on the matching information.

3. The method of claim 2, wherein the determining the correlation values includes:
    determining, as a correlation value between two input images from among the correlation values between the plurality of input images, a number of matched pairs of the two-dimensional feature points included in the two input images.

4. The method of claim 1, wherein
    the two input images to be registered first correspond to a maximum or highest correlation value of the correlation values between the plurality of input images.

5. The method of claim 1, wherein the determining the registration order includes:
    determining a sum of the correlation values between each input image of the plurality of input images that is not registered yet and the input images that are registered already; and
    determining an input image corresponding to a maximum or highest value of the sum from among the input images that are not registered yet as the present input image to be registered next to the input images that are registered already.

6. The method of claim 1, wherein the sequentially generating the pose information includes:
generating virtual depth data based on depth data of the input images that are registered already; and
generating the pose information of the present input image to be registered next to the input images that are registered already based on the virtual depth data and the depth data of the present input image.

7. The method of claim 6, wherein the generating the virtual depth data includes:
converting the input images that are registered already to three-dimensional images with respect to a same coordinate system; and
generating a depth value per each pixel of the virtual depth data based on an average value of depth values respectively corresponding to the three-dimensional images.

8. The method of claim 7, wherein the average value of the depth values is obtained by an arithmetic average.

9. The method of claim 7, wherein the average value of the depth values is obtained by a weighted average using weight values corresponding to correlation values between the present input image and the input images that are registered already.

10. The method of claim 6, wherein the generating the pose information of the present input image to be registered next includes:
determining, based on the image graph, a most-correlated input image from among the input images that are registered already such that a correlation value between the most-correlated input image and the present input image from among the correlation values between the plurality of input images is greatest from among the input images that are registered already; and
determining initial pose information of the present input image based on depth data of the most-correlated input image and the depth data of the present input image.

11. The method of claim 10, wherein the generating the pose information of the present input image further includes:
correcting the initial pose information based on the virtual depth data and the depth data of the present input image to generate the pose information of the present input image.

12. The method of claim 10, wherein the generating the virtual depth data includes:
converting the input images that are registered already to three-dimensional images with respect to a same coordinate system corresponding to the initial pose information; and
generating a depth value per each pixel of the virtual depth data based on an average value of depth values respectively corresponding to the three-dimensional images.

13. The method of claim 6, wherein the generating the pose information of the present input image includes:
performing an iterative closest point (ICP) algorithm based on the virtual depth data and the depth data of the present input image.

14. The method of claim 6, wherein the generating the virtual depth data includes:
determining, based on the image graph, non-correlated input images fro among the input images that are registered already such that a correlation value between the non-correlated input images and the present input image from among the correlation values between the plurality of input images is smaller than a threshold value; and
excluding the non-correlated input images from the input images that are registered already in generating the virtual depth data.

15. The method of claim 1, further comprising:
determining, based on the image graph, a noisy input image from among the plurality of input images such that correlation values between the noisy input image and other input images are smaller than a threshold value; and
discarding the noisy input image.

16. The method of claim 1, wherein reconstructing the three-dimensional model includes:
generating a three-dimensional point cloud based on the registered input images; and
reconstructing the three-dimensional model based on the three-dimensional point cloud.

17. The method of claim 16, wherein
the generating the three-dimensional point cloud includes improving the three-dimensional point cloud by performing a three-dimensional bundle adjustment with respect to the registered input images, and
the reconstructing the three-dimensional model based on the three-dimensional point cloud includes reconstructing a surface of the three-dimensional model using a truncated signed distance function (TSDF).

18. A method of generating a three-dimensional model, comprising:
obtaining, by a data processing device, a plurality of input images such that each input image of the plurality of input images includes color data and depth data of a target;
extracting, by the data processing device, two-dimensional feature points included in each input image of the plurality of input images based on the color data of each input image of the plurality of input images;
generating, by the data processing device, an image graph based on matching information of the two-dimensional feature points such that the image graph includes correlation values between the plurality of input images;
determining, by the data processing device, a registration order of input images of the plurality of input images based on the image graph;
generating, by the data processing device, virtual depth data based on depth data of the input images that are registered already;
generating, by the data processing device, pose information of a present input image to be registered next to the input images that are registered already based on the virtual depth data and the depth data of the input images that are registered already;
sequentially registering, by the data processing device, the plurality of input images as registered input images such that each registered input image of the plurality of input images includes the pose information; and
reconstructing, by the data processing device, the three-dimensional model of the target based on the registered input images.

19. The method of claim 18, wherein the generating the pose information of the present input image to be registered next includes:
determining, based on the image graph, a most-correlated input image from among the input images that are registered already such that a correlation value between the most-correlated input image and the present input image from among the correlation values between the plurality of input images is greatest from among the input images that are registered already;

determining an initial pose information of the present input image based on the depth data of the most-correlated input image and the depth data of the present input image; and correcting the initial pose information based on the virtual depth data and the depth data of the present input image to generate the pose information of the present input image.

20. A data processing device comprising:

processing circuitry configured to receive a plurality of input images such that each input image of the plurality of input images includes color data and depth data of a target, generate an image graph based on the color data of the plurality of input images such that the image graph includes correlation values between the plurality of input images, determine a registration order of the plurality of input images based on the image graph, the determine the registration order of the plurality of input images including determining, based on the correlation values between the plurality of input images, two input images to be registered first and determining a present input image to be registered next based on correlation values between input images not registered yet and input images registered already, sequentially generate pose information of each input image of the plurality of input images based on the registration order and the depth data of the plurality of input images, sequentially register the plurality of input images as registered input images such that each registered input image includes the pose information; and reconstruct a three-dimensional model of the target based on the registered input images.

* * * * *